US009338586B2

(12) United States Patent
Basalamah et al.

(10) Patent No.: US 9,338,586 B2
(45) Date of Patent: May 10, 2016

(54) TRACKING AND COMMUNICATING WITH SHORT-RANGE COMMUNICATION DEVICES

(71) Applicant: UMM AL-QURA UNIVERSITY, Makkah (SA)

(72) Inventors: Anas Basalamah, Makkah (SA); Shuja Jamil, Makkah (SA); Saleh Basalamah, Makkah (SA)

(73) Assignee: Umm Al-Qura University, Makkah (SA)

( * ) Notice: Subject to any disclaimer, the term of this patent is extended or adjusted under 35 U.S.C. 154(b) by 0 days.

(21) Appl. No.: 14/404,086

(22) PCT Filed: Sep. 11, 2014

(86) PCT No.: PCT/IB2014/001792
§ 371 (c)(1),
(2) Date: Nov. 26, 2014

(87) PCT Pub. No.: WO2016/038403
PCT Pub. Date: Mar. 17, 2016

(65) Prior Publication Data
US 2016/0080891 A1    Mar. 17, 2016

(51) Int. Cl.
*H04W 4/00* (2009.01)
*H04W 8/00* (2009.01)
*H04W 4/02* (2009.01)
*H04W 60/02* (2009.01)

(52) U.S. Cl.
CPC .............. *H04W 4/008* (2013.01); *H04W 4/023* (2013.01); *H04W 8/005* (2013.01); *H04W 60/02* (2013.01)

(58) Field of Classification Search
CPC ....................................................... H04W 8/005
USPC ................................................ 455/41.1–41.3
See application file for complete search history.

(56) References Cited

U.S. PATENT DOCUMENTS

| 6,685,093 | B2 * | 2/2004 | Challa et al. ............. 235/462.46 |
| 2010/0062712 | A1 | 3/2010 | Lakshmanan |
| 2012/0202185 | A1 * | 8/2012 | Jabara et al. .................. 434/350 |

FOREIGN PATENT DOCUMENTS

| CN | 101593372 | 12/2009 |
| CN | 102693564 | 9/2012 |
| CN | 202939665 | 5/2013 |

OTHER PUBLICATIONS

Francisco, I. G., et al., "Developing an automatic attendance register system for CPUT", URL: http://www.academia.edu/4079035/Developing_an_automatic_attendance_register_system, pp. 1-24 (Dec. 3, 2013).
International Search Report and Written Opinion issued May 21, 2015 in PCT/IB2014/001792 filed on Sep. 11, 2014.

* cited by examiner

*Primary Examiner* — Tuan H Nguyen
(74) *Attorney, Agent, or Firm* — Oblon, McClelland, Maier & Neustadt, L.L.P

(57) ABSTRACT

First communication circuitry of a first device is made discoverable by a second device via a short-range wireless protocol. A device name for the first communication circuitry is set to a user identifier that is specific to a user of the first device. The second device discovers the first device and the user identifier is transmitted to the second device. A response message can also be included with the user identifier and can be appended to the user identifier. The second device stores the user identifier, and the response message if included, in a log to record a presence of the user of the first device within a range between the first and second devices of the short-range wireless protocol.

20 Claims, 16 Drawing Sheets

TRACKING AND COMMUNICATING WITH SHORT-RANGE COMMUNICATION DEVICES

BACKGROUND

1. Field of the Disclosure

Aspects of this disclosure relate to using short-range communication technology, such as Bluetooth technology, and personal devices, such as smartphones, for communication systems, such as response and tracking systems.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Bluetooth is a short-range Radio Frequency (RF) technology that works in the 2.4 GHz ISM band and is capable of point-to-multipoint connections at speeds up to 1 Mbps. Bluetooth is widely available in smartphones, and has been widely used to provide wireless connectivity between smartphones as well as between a smartphone and external devices such as laptops, headsets and gaming devices. Bluetooth signals do not require line-of-sight, and can penetrate some physical barriers with a range up to 10 meters.

U.S. Patent Application Publication Number 2010/0062712, published Mar. 11, 2010, discloses a Bluetooth enabled identification device for Bluetooth based identification, communication, and tracking. Bluetooth hardware is used as identification of location through a 48 bit unique hardware address and password-based identification.

WO/2012/034086, published Mar. 15, 2012, discloses a classroom response system. Network connectivity is formed between devices, and a student can respond to an instructor via the network connectivity.

SUMMARY OF THE EXEMPLARY IMPLEMENTATIONS

One exemplary aspect of this disclosure includes a graphical user interface (GUI) for in-class student attendance (i.e., attendance tracking). A course registration list can be downloaded on a professor's device, and a master device interface can be displayed on the professor's device. A slave device interface can be displayed on a student's device. A short-range communication interface can be established between the slave device and the master device. The slave device interface can include an input interface for the student to acknowledge the student's class attendance, and the master device can receive a corresponding indicator from the slave device. A master device can scan for slave device acknowledgements from slave devices. A device name for the slave device can be replaced with an identification number of an owner or user of the slave device.

A further exemplary aspect includes a multi-platform and inter-operable in-class student response logging system (i.e., response tracking). A method can initiate a multiple choice question on an instructors' device and can log students with IDs and passwords on their electronic devices. The students can select an answer on their devices, where Bluetooth devices name of the students' devices can be replaced by corresponding student IDs and answers. The instructor's device can scan and detect signals, and can parse logged device names to extract the student IDs and answers from the detected signals. The answers can be logged in the instructor's device, and can be integrated and visualized in a graphical user interface (GUI) that may utilize Microsoft PowerPoint or other presentation software.

Aspects of this disclosure propose utilizing built-in Bluetooth technology of a smartphone for automated classroom response logging, attendance tracking, or other purposes by frequently scanning for Bluetooth device names between devices, without the necessity of pairing the devices or networking the devices. By changing the device name to adapt to a student's answer or other response, a teacher's device can log the response without requiring a network connection to be established.

These exemplary aspects can be embodied in corresponding methods, devices, computer-readable media, and in computer program code executed by processing circuitry, as will be appreciated in view of the following detailed description.

BRIEF DESCRIPTION OF THE DRAWINGS

A more complete appreciation of the disclosed implementations and many of the attendant advantages thereof will be readily obtained as the same becomes better understood by reference to the following detailed description when considered in connection with the accompanying drawings, wherein.

DETAILED DESCRIPTION

Figure 1:
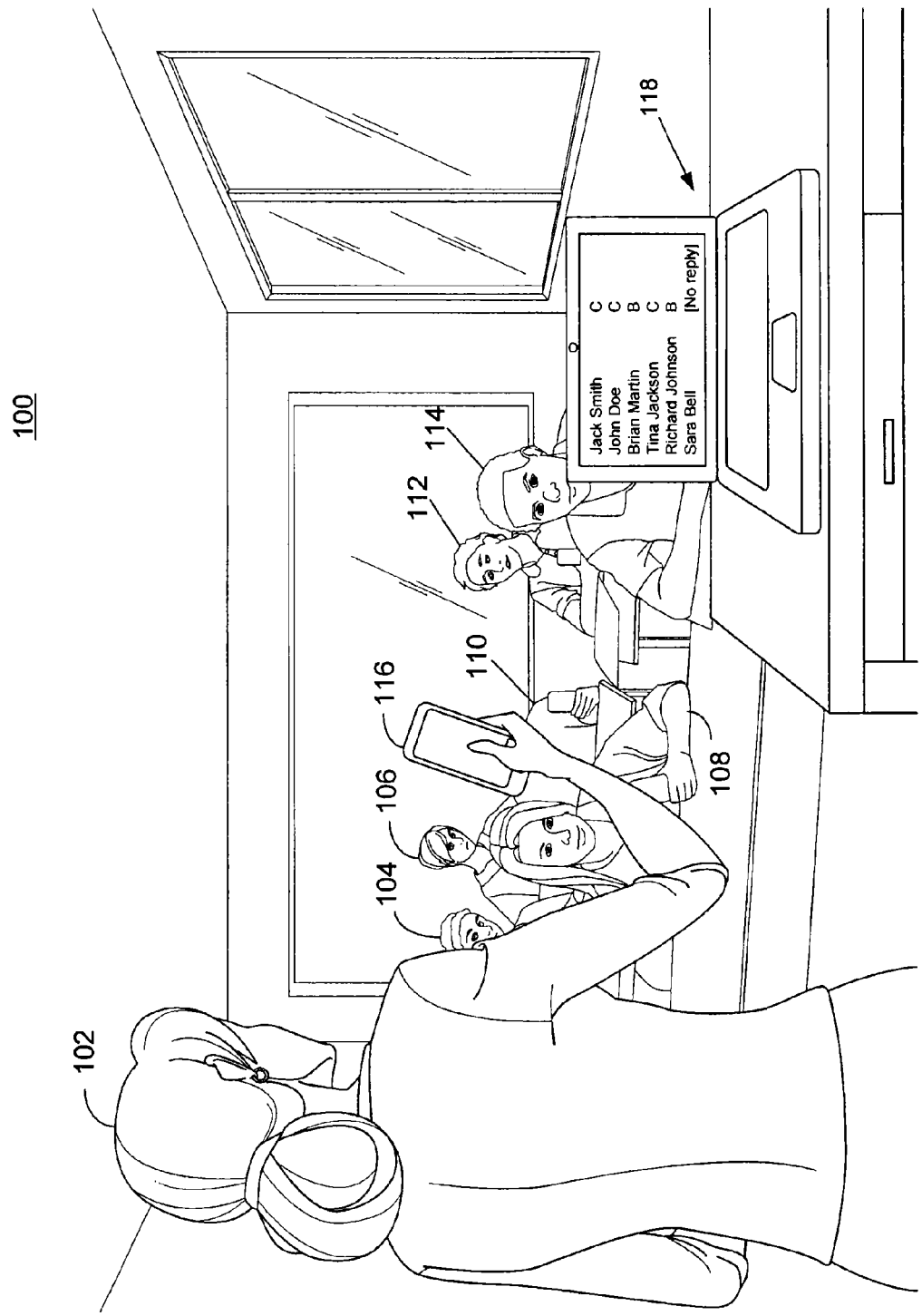
FIG. 1 is an example classroom setting.

In the drawings, like reference numerals designate identical or corresponding parts throughout the several views. Further, as used herein, the words "a," "an" and the like generally carry a meaning of "one or more," unless stated otherwise.

The drawings are generally drawn to scale unless specified otherwise or illustrating schematic structures or flowcharts.

The terms "professor," "teacher," "instructor," "organizer," "presenter," etc., may be used interchangeably and carry the same meaning in the context of this disclosure. Further, such entities are, for the purposes of discussion, understood to be the users of a master or primary device according to exemplary aspects of this disclosure. Likewise, the terms "student," "participant," "attendee," etc., may be used interchangeably and carry the same meaning in the context of this disclosure. Further, such entities are, for the purposes of discussion, understood to be the users of a slave or secondary device according to exemplary aspects of this disclosure.

Furthermore, the terms "about," "approximately," "around," and similar terms generally refer to ranges that include the identified value within a margin of 20%, 10%, or preferably 5%, and any values therebetween.

OVERVIEW OF THE EXEMPLARY IMPLEMENTATIONS

Introduction

The described exemplary implementations, together with further advantages, will be best understood by reference to the following detailed description taken in conjunction with the accompanying drawings.

For students in a university setting, there is an attendance logging problem. This problem affects both the teacher (professor) and the students and can waste a significant amount of the student learning time. For example, some teachers/professors call students by their names to check their attendance. When the number of registered students is high, this procedure can consume up to 20% of the class time. Other professors may prefer to distribute an attendance sheet and request students log their names and forward the sheet to the rest of the class. However, students may provide fake information or become distracted from the ongoing lecture. Other limitations of these traditional techniques may involve human error in logging or the inefficient handling of latecomers.

A recent project proposed by a group of students from the Indian Institute of Technology, Delhi developed a multi-component attendance system that included a mobile application utilizing Bluetooth, a web service, a database and a web portal. The smartphone application only runs on the teacher's (or professor's) smartphone, which is connected to a server, and allows the professor to scan Bluetooth devices in range and match their mac-addresses with an already-saved database of mac-addresses.

In exemplary implementations of this disclosure, users are not restricted to server connectivity, databases, web portals or internet coverage. In addition, exemplary implementations of this disclosure can use Device Names (e.g., Bluetooth Device Names) to avoid registering fixed MAC addresses or some other device-specific identifier, which can limit attendance schemes to pre-registered devices. Finally, the discussed exemplary implementations can provide a well-designed UI for students to get feedback about their connectivity to avoid miss-recording due to technical errors such as a failure to detect a signal.

The I>CLICKER is a student response system manufactured by Macmillan New Ventures, a division of Macmillan. This system enables student submission of answers in class. Student devices (i.e., "clickers") use infrared or radio frequency technology to transmit and record student responses to questions. A small, portable receiving station is placed in the front of the class to collect and record student responses. Each clicker can be registered to a student (or not, depending on the teacher's prerogative) and generates a unique, identifiable signal. The system allows active participation by all students and provides immediate feedback to the instructor and the students about any confusion or misunderstandings of the material being presented.

In an exemplary implementation of this disclosure, smartphones and their embedded technologies are configured to improve students' in-class interaction. Students face a serious in-class interaction problem where professors usually follow traditional in-class interactions methods like asking a simple "do you understand?" question or quiz-like questions. In both cases, only a portion of students may actually interact with the professor: either those who understand or those who know the answer to the quiz question. Other students may be left out from this interaction. In many cases, students may be shy to show their misunderstanding of the lectures or may lie about their ability to comprehend the content. A pop-up quiz or a quick question may help to give feedback to the professor on the students' status of understanding. However, traditional "raise your hands" methods may fail to deliver this answer. On the other hand, brute-forcing every student to provide an answer may waste most of the lecture time.

An objective of an exemplary implementation of this disclosure is to utilize smartphone systems and the embedded Bluetooth modules inside smartphones carried by students to autonomously log their responses within seconds, without having to perform the task manually. In an exemplary implementation, a Bluetooth name of a module is replaced with a student response and a student ID, and a pairing operation between devices is avoided.

A device according to this disclosure can use short-range wireless communications. Exemplary short-range wireless communication technologies include WiFi, Bluetooth, ultrasonic waves, infrared, near-field communication (NFC), and radio-frequency identification (RFID). The examples discussed herein utilize Bluetooth, but it should be appreciated a different short-range wireless technology can replace Bluetooth in other implementations. For example, any of the above-listed or another short-range wireless communication technology can be utilized in other implementations. An exemplary device according to this disclosure is a smartphone, a tablet, a smart watch, a laptop, or a similar device.

FIG. 1 is a non-limiting example that shows a classroom 100 with a professor 102 having a personal device (e.g., a smartphone or a tablet computer—sometimes referred to herein as a master device) 116 and a plurality of students 104, 106, 108, 110, 112, and 114, each having a personal device (e.g., a smartphone or a tablet computer). Each of these devices constitutes a processing system that includes both generic computer processing components and unique configurations, which may be provided by unique applications, that cause the devices the perform the special and advantageous algorithms discussed herein. A further discussion of the hardware circuitry included in the processing systems is provided below.

The master device 116 can be in network communications with a personal computer 118. The personal computer 118 can take the form a processing system, a further discussion of which is provided below.

Results of the processing and transfer of information between the devices can be displayed on the personal computer 118, e.g., on the display screen. For example, responses or attendance results can be actively displayed to the professor and/or to the students. The personal computer 118 can also be connected to a remote server to transfer data thereto for storage and remote access by the professor and/or the students. The personal computer can also be connected to a projector or other display for classroom viewing.

While aspects of this disclosure are discussed in the context of a classroom with students and a professor, the teachings herein can also be applied to trade shows, symposiums, presentations, and other interactions where attendance tracking and response systems can be utilized. Also, the functionality and hardware of a master device can be distributed among a plurality of individual distributed devices, where the distributed devices can collaborate to combine responses and/or attendance results. This aspect is beneficial when there are many participants or the event in question takes place in a large space where Bluetooth, e.g., may not be able to cover an entire area.

An exemplary system can include a first device including: first communication circuitry configured to communicate with a second device by a short-range wireless protocol; and first control circuitry configured to: activate the first communication circuitry so that the first communication circuitry is detectable by the second device via the short-range wireless protocol, set a device name for the first communication circuitry to a user identifier that is specific to a user of the first device, receive a scan signal from the second device via the first communication circuitry and the short-range wireless protocol, and transmit the user identifier to the second device via the first communication circuitry and the short-range wireless protocol in response to receiving the scan signal.

A response to a question can be appended to the user identifier. The question itself can also be transmitted from the first device to the second device or merely displayed to the user of the second device by a projector or monitor.

The system can further include the second device, which can include: second communication circuitry configured to communicate with the first device by the short-range wireless protocol; and second control circuitry configured to: activate the second communication circuitry to transmit the scan signal to the first device, receive the user identifier of the first communication circuitry of the first device via the second communication circuitry and the short-range wireless protocol in response to the first device receiving the scan signal and transmitting the user identifier to the second device, and store, in memory circuitry of the second device, the user identifier in a log to record a presence of the user of the first device within a range between the first and second devices of the short-range wireless protocol.

When a response to a question is sought, both response and attendance tracking can be performed at the same time. Alternatively, if attendance tracking is not desired, then a log of the responses can merely be stored and displayed. Here, the discussed "attendance scan" can merely be referred to as a "question scan" or an "inquiry scan" that has substantially the same technical functionality and characteristics.

The system may further include: a plurality of slave devices, each of the slave devices including the first communication circuitry and the first control circuitry of the first device, wherein the second device is a master device that executes an attendance or question (inquiry) scan that receives the user identifier of each of the slave devices in response to executing the scan, and the second device records, in the memory circuitry of the second device, a log to record the presence of users of the slave devices based on received user identifiers and a time at which each of the received user identifiers is received and/or a response from the user that is appended to the user identifiers.

The second control circuitry of the second device may be further configured to: display, on a display of the second device, a graphical user interface for a user of the second device to log into the second device to activate the scan and to access registration records that include a list of expected users that are expected to be detected via the scan, compare the received user identifiers with the list of expected users and responses, if expected, generate an attendance status of the expected users, and record, in the memory of the second device, the attendance status of the expected users in the attendance log and responses in a response log. The response log can be displayed as appropriate or desired.

The second control circuitry of the second device may be configured to display, on the display of the second device, a chart illustrating the attendance status of the expected users and/or a chart or responses and user names. The second control circuitry may be configured to display, on the display of the second device, a graphical user interface for the user of the second device to manually edit the corresponding logs.

The short-range wireless protocol may be a Bluetooth protocol. No network may be established between the first and second devices via the short-range wireless protocol.

The second device may request the user identifier from the first device periodically.

The second device may request the user identifier from the first device based on a manual request by a user of the second device.

Each of the first and second control circuitry may be configured to download and execute an application and authenticate usage of the application, such that each of the first and second control circuitry is not authorized or able to communicate with each other via the short-range communication protocol to perform an attendance scan process until authentication has been performed.

The device name for the first communication circuitry may be preset to a device-specific identifier, and the first control circuitry may be configured to set the device name for the first communication circuitry by replacing the device-specific identifier with the user identifier and or the user identifier and an appended response. The user identifier may be a student identification number, an email address, or another pre-registered or pre-authenticated ID unique to the user.

The second control circuitry may be configured to activate the second communication circuitry to transmit the scan signal to the first device about every 30 seconds.

The first control circuitry may be configured to set a status of idle and to set a status of available, such that the status of idle results in the first control circuitry not transmitting the user identifier to the second device, and such that the status of available results in the first control circuitry transmitting the user identifier to the second device.

The first and second devices can be smartphones or tablets.

The second control circuitry of the second device may be configured to: access a registration database of a course; download registration records for the course from a remote server; display a list of students enrolled in the course; and display the list of students enrolled in the course together with an indication correlating the user identifier received from the first device with a student listed in the list of students enrolled in the course.

The short-range wireless protocol may be a protocol that utilizes communication circuitry based on: near-field communication (NFC), WiFi, infrared communications, ultrasonic signal generators, or radio-frequency identification (RFID) circuits.

Other exemplary implementations are discussed in more detail below.

In one aspect, the exemplary implementations utilize networking and processing capabilities of modern smartphones and provide software with an advanced GUI to make minimal yet useful interaction with the user without the need for an external dongle (e.g., a Bluetooth dongle or RF dongle for a separate communication device) or a laptop.

An exemplary implementation of this disclosure includes a smartphone-based attendance and response tracking system, wherein the objective is to utilize communication modules that are embedded inside smartphones carried by event attendees or students to autonomously detect and log their attendance records and responses without having to perform it manually. Although the exemplary implementations discussed herein are directed to a classroom environment, similar implementations can be used in other environments to implement tracking or monitoring.

Attendance Tracking

A system can assist university professors in logging student attendance records by utilizing existing smartphones carried by the professor and his students. In some exemplary aspects, a goal of this disclosure is to create an automated student attendance logging system using a smartphone's built-in Bluetooth technology, and to provide a novel smartphone application. The advantages of such an exemplary implementation include saving attendance logging time and reducing the technology deployment cost by implementing the system on personal smartphones.

Aspects of this disclosure present a novel method to utilize smartphone built-in Bluetooth technology for automated attendance logging via a frequent scanning of Bluetooth device names, without the necessity of pairing devices or networking them. The aspects of this disclosure discussed herein support multiple platforms and are interoperable. By adopting the teachings of this disclosure, an educator, for example, may focus on teaching without worrying about attendance logistics.

An exemplary system according to this disclosure also enables retrieving real-time and accurate attendance logs and the ability to export them in different formats. The exemplary system also provides a seamless interface with minimal user interaction.

Application Design

Figure 2:
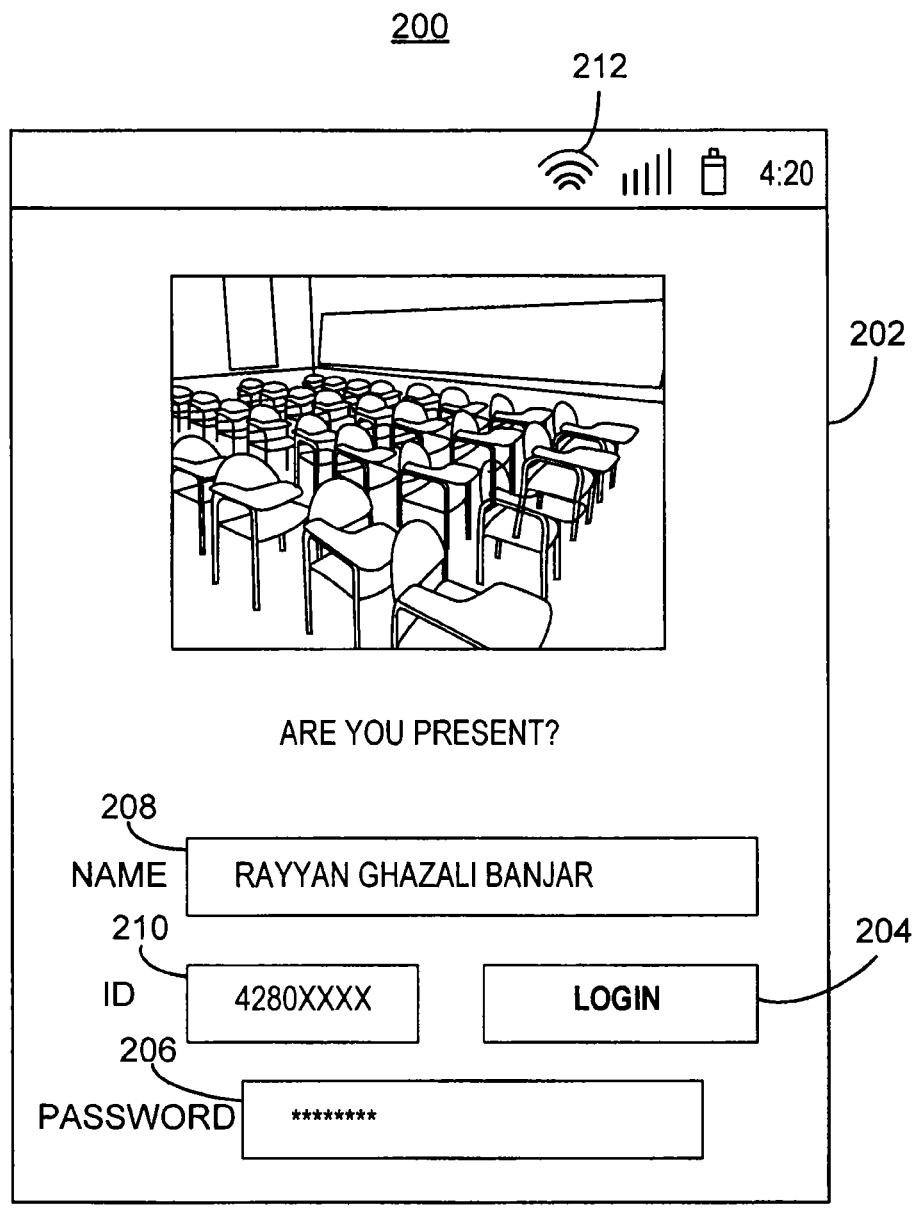
FIG. 2 illustrates an exemplary graphical user interface (GUI) window showing an application interface.

To better describe exemplary implementations of an application design, consider a scenario where a professor enters a classroom of students (i.e., the classroom 100 illustrated in FIG. 1) and wishes to take attendance records of the students. FIG. 2 illustrates an exemplary GUI 200 that includes an exemplary application interface 202 (i.e., a graphical user interface, GUI) displayed on, e.g., a student's smartphone. Instead of manually calling the students' names or passing an attendance sheet throughout the classroom, the professor runs an application, logs in using, e.g., his University ID and Password, and requests all students to do so as well as shown in FIG. 2.

In the GUI of FIG. 2, a student enters the student's name, a university ID, and a password to login. Icon 212 indicates wireless short range connectivity with a master (host) device (e.g., the professor's smartphone). Window 208 includes a name of the student. Window 210 is an interface to enter the student's ID. Window 204 shows a login status and is an interface to execute a login operation, discussed in more detail below. The student can enter a password in window 206. The professor can perform the same or similar operations using the professor's credentials and a same or similar GUI as that illustrated in FIG. 2.

Course registration records may be downloaded in advance from a server (e.g., a University registrar server) and utilized by the application to match professors with students. The professor's smartphone will show a master device GUI, where the professor can be provided with detailed information on the students' attendance logs. On the other hand, the students' smartphones can show a slave device GUI, where a simple feedback is given to the student to acknowledge his attendance.

According to certain implementations, a professor connects to a server as necessary and obtains a class list, which according to some implementations can be periodically updated (e.g., at the beginning or prior to every class, every week, every month, or every quarter/trimester/semester). It is not necessary for a professor to login to a University system (i.e., a University or other remote server) to perform an attendance scan. While the professor and the students may login to their respective applications on their smartphones by authenticating their IDs and their passwords with a remote server, such an operation can optionally be only performed once, upon registering a student's or a professor's smartphone and application with the remote server, thereby authorizing later usage of the smartphone and the application for later attendance scan procedures without requiring further authentication by the remote server.

That is, for example, the application may only require authentication by the remote server upon initial login after the application is downloaded and installed. The application may further require authentication from, e.g., the professor when the professor's smartphone updates registrar information or from the professor or a student when either is using a new device or a new installation of the application. After such authentication(s), the application may merely require a simple, non-remote-authentication based login that can utilize the user's University ID and password, but performs authentication locally. Alternatively, the user can use a different or independent password to access and use the application after the initial login/authentication. Reference herein to "login" thus encompasses a local login, which does not include a remote-server authentication, and a remote login, which includes a remote-server authentication.

Upon login by entering a password, the master device (i.e., the professor's smartphone) identifies students registered in the class list. The master device sends a request for verification to slave devices of the students, and the slave devices provide a corresponding response. The master device then performs attendance logging.

Figure 3:
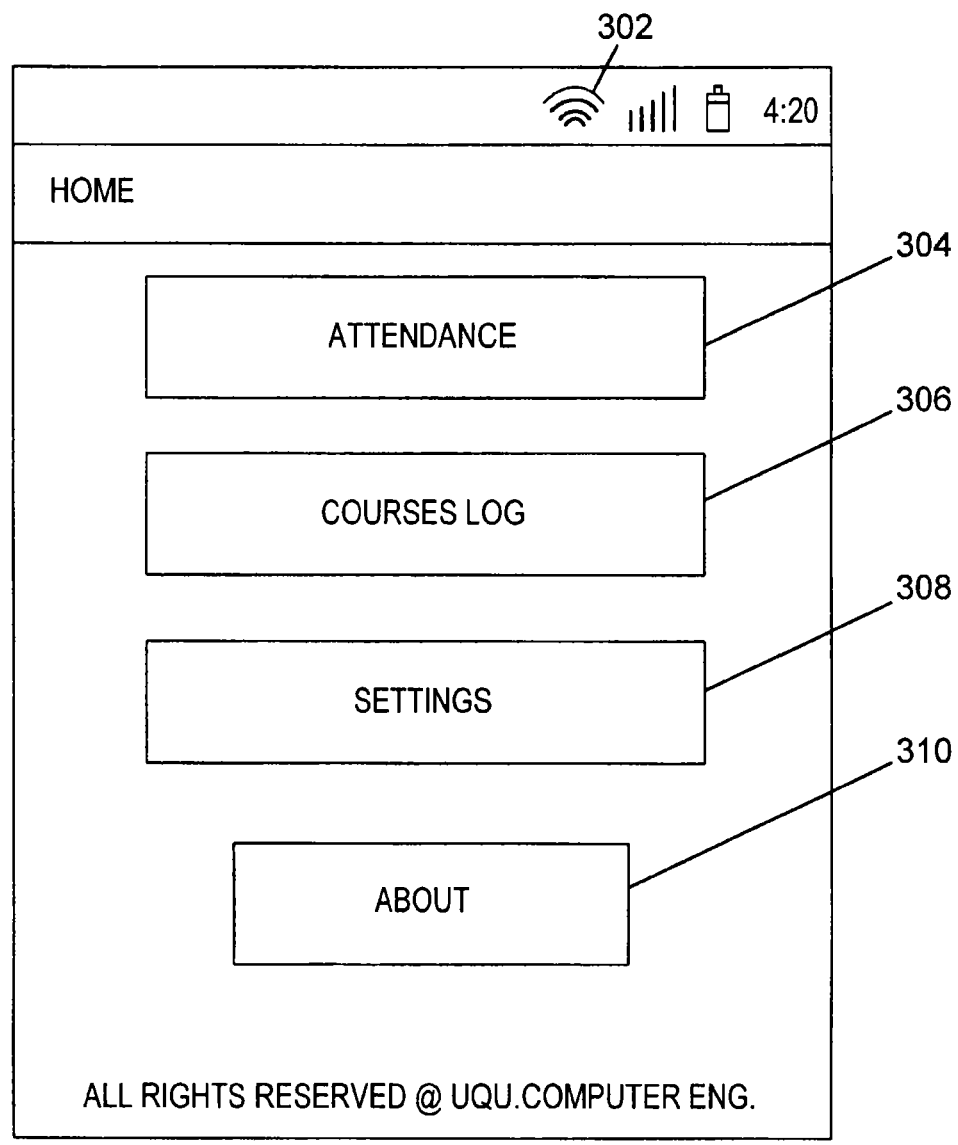
FIG. 3 illustrates an exemplary GUI that includes a home interface for a master device.

FIG. 3 is an exemplary home GUI 300 for a master device (e.g., a professor's smartphone) according to some implementations. In FIG. 3, main menu interface buttons including Attendance button 304, Courses Log button 306, Settings button 308, and About button 310 may be selected by the professor on the professor's smartphone. After selecting the Attendance button 304 from the main menu in FIG. 3, the professor's smartphone will perform the attendance logging autonomously, which includes continuous, semi-continuous, or one-time device discovery of students' smartphones during, e.g., the class time period. This feature is explained in more detail below. Icon 302 can indicate short range wireless connectivity between a slave device and a master device or can indicate other wireless connectivity to a network, such as a WiFi network.

The slave devices (i.e., the students' smartphones) can also display a GUI 300, consistent with that illustrated in FIG. 3 to obtain or display specific information corresponding to the Attendance button 304, Courses Log button 306, Settings button 308, and About button 310. However, in some exemplary implementations, the access granted to the students is limited so as not to perform an attendance logging function or other similar functions reserved for the professor's smartphone.

Figure 4:
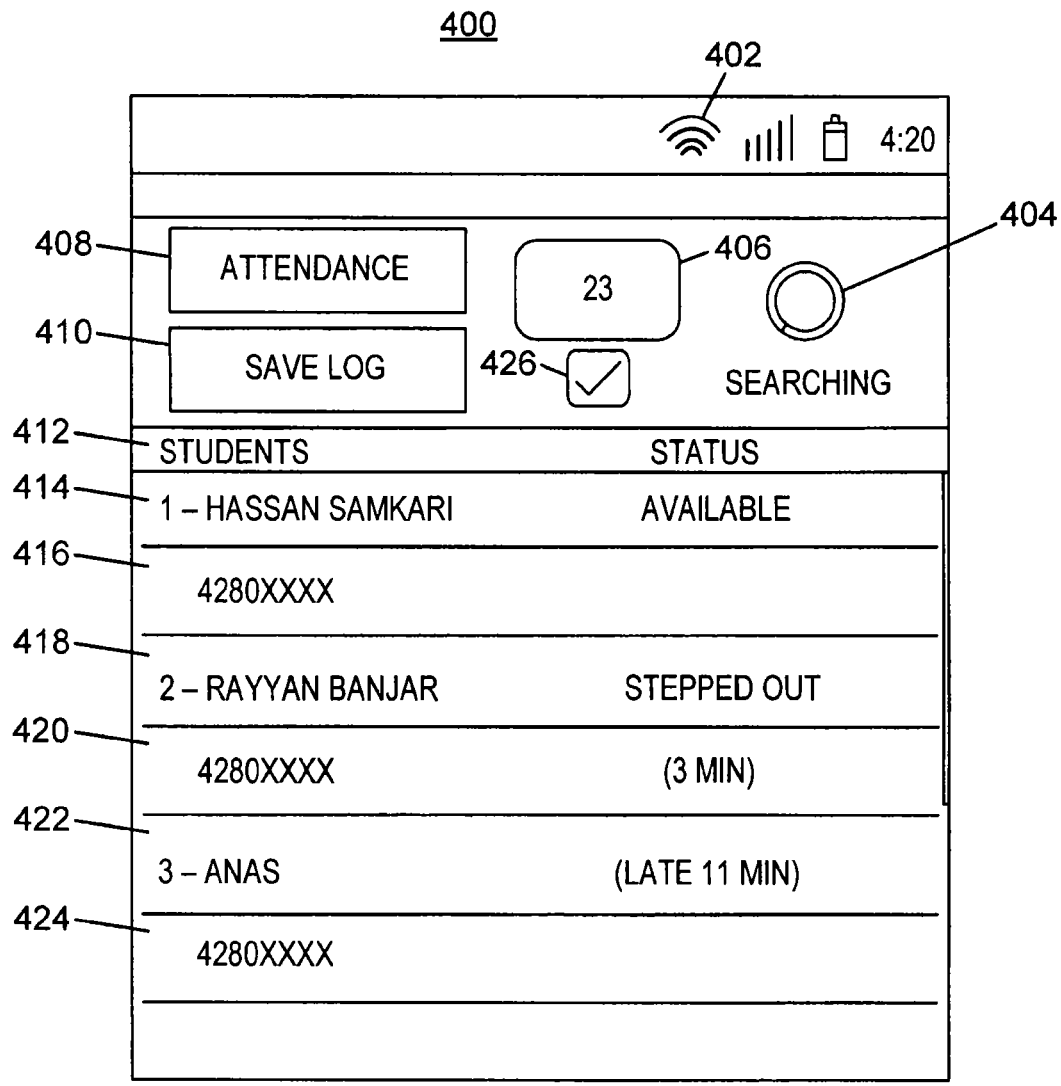
FIG. 4 illustrates an exemplary GUI for an attendance interface of a master device.

FIG. 4 illustrates an exemplary attendance GUI 400 of a master device (e.g., a professor's smartphone). Student names can be displayed in regions 414, 418, and 422 of the GUI 400, and their corresponding IDs can be displayed in regions 416, 420, and 424 of the GUI 400. These names and/or the IDs can be displayed by the professor's smartphone, and corresponding records can be logged (i.e., recorded in a memory of the smartphone and/or to a remote server if a network connection is present) autonomously once every predefined time period. The predefined time period can be set to, e.g., 30 seconds, 1 minute, any time within 1-30 minutes, or once every class/session period. The logging can also be performed after a delay, in the middle, or towards the end of a set time period, as opposed to at the beginning of a time period. For example, the autonomous logging can occur after a preset delay from the professor logging into the master device. The preset delay can be set to, e.g., 30 seconds, 1 minute, or any time within 1-30 minutes. Other predefined time periods and preset delays can be set without detracting from the teachings of this disclosure.

Alternatively or in combination with the above-discussed automated aspects, the professor may initiate an attendance scan by activating attendance button 408. For example, the attendance button 408 can provide a manual activation of an attendance scan process, in combination with or alternative to an automated, preset, or scheduled attendance scan process. Further, alternatively or in combination with the above-discussed automated aspects, the professor may initiate recordation of an attendance log by activating the save log button 410. For example, the save log button 410 can provide a manual activation of a log-recording process, in combination with or alternative to an automated, preset, or scheduled log-recording process.

The professor may validate the records by counting the students manually in order to make sure that no one is missed or no one is detected from the corridor while not being in-class. This process is likely to consume less time compared to an amount of time needed to call students' names, especially when there are many students present. Icon 402 indicates short range wireless connectivity between a slave device and a master device (or another network connectivity), and window 406 includes a number of devices present in the classroom. Icon 404 shows to the professor that the device is searching for other wireless devices, and checkbox 426 allows a user (e.g., the professor) to enable or disable a scan (whether automated or manual).

As illustrated in the status portion of GUI 400, the master device can calculate whether a student was late to a class based on a predefined class start time (e.g., a time that was accessed from the University registrar server previously or in real-time) and display a resulting value as the student's status. In this example, the application causes the master device to perform a time-based subtraction calculation to obtain the value of "Late 11 Min" illustrated in GUI 400.

Similarly, the application can cause the master device to calculate an amount of time the student has been out of the classroom (i.e., out of range or unable to detect). For example, the GUI 400 can display a student has "stepped out" for "3 min" as illustrated in GUI 400. This amount of time may refer to an amount of time the student has "stepped out" in total for an entire class period, or merely to a single occurrence of the student "stepping out," where the attendance log, as discussed in more detail below, can illustrate specific details concerning the attendance history of students throughout the class period.

Figure 5:
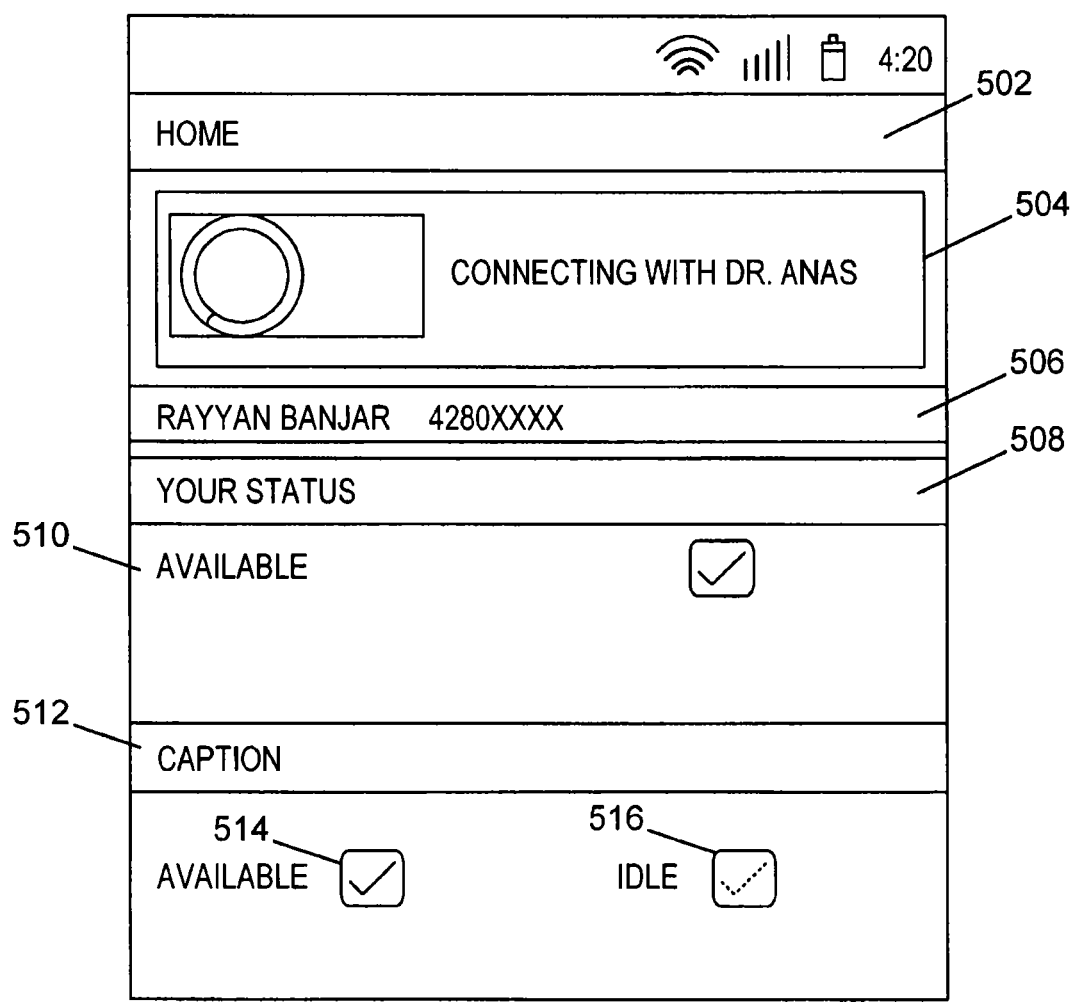
FIG. 5 illustrates an exemplary GUI of a home interface of a slave device.

FIG. 5 is an example of a home GUI 500 including a home heading 502 on a slave device (e.g., a student's smartphone). Display area 504 can show to student 506 that the device of the student 506 is connected, was recently connected, or is connecting with a master device (e.g., the device of the professor) for the purpose of attendance scans. GUI 500 includes a status 510 of the student and two options under caption 512. The two options are Available 514 and Idle 516.

In one example, "available" refers to the presence of a student in a classroom, while "idle" refers to the absence of a student from the classroom. For example, the student may manually select "idle" to inform the professor of a temporary absence from the classroom, where the student may leave his smartphone within the classroom (e.g., within communication range of the master device). Alternatively, if the student selects "idle," and then leaves the classroom with the student's device, then the master device can record the student's idle time from when the student leaves until when the student returns. On the other hand, if the student does not select "idle," but nonetheless leaves the classroom with the student's device, then the master device can record an "idle" state for the student for a time period where successive scans by the master device did not detect the student's device. In exemplary implementations, the student 506 can check his status 510 to make sure he is logged in, as is the case in FIG. 5, and change his status accordingly via the options under caption 512. The "idle" state of a slave device can be implemented by, e.g., temporarily disabling the Bluetooth device of the slave device or changing the Bluetooth name so as not to identify the student. In that case, activating the "available" state can change the Bluetooth name back to identify the student.

An exemplary system supports manual entry by, e.g., the professor via the master device for various reasons. For example, if a student is not detected due to signal failure or battery loss, then the master device may not record an accurate attendance log. Throughout the class session, the system will autonomously record the log, and after finishing the class, the professor and students will have the ability to view logs and export them in different formats. For example, a conventional charting or graphing application can be utilized to display results within the application environment of the attendance tracking module. Furthermore, the professor may manually edit attendance logs at any time while data is being logged/recorded or afterwards to account for any connectivity or technical issues (e.g., when a slave device or the master device malfunctions or loses battery power).

Attendance Scanning

Aspects of this disclosure can utilize built-in inquiry procedures of the Bluetooth protocol to discover nearby devices, and a built-in logical link establishment procedure to retrieve a so-called "Bluetooth Device Name." Similar procedures can be implemented when non-Bluetooth technologies are utilized in other implementations. Each Bluetooth device is addressable by a globally unique 48 bit Bluetooth Device Address that is assigned at the time of manufacture. In addition, each device carries a "Bluetooth Device Name" assigned by the user and retrievable by other Bluetooth devices without prior authentication. Other implementations of this disclosure can utilize similar procedures for other short-range technologies.

Bluetooth device names allow users to easily identify devices. For example, an exemplary process sets the Bluetooth device name to be the University ID such that, e.g., a professor who is trying to take attendance records with his smartphone is presented with a list of University IDs in range rather than a list of Bluetooth Device Addresses. By "in range" it is understood that devices can communicate with each other via Bluetooth (i.e., the devices are close enough without obstacles or other interference to transmit and receive signals from each other). If different short range communication technologies are used, then the range may vary.

Upon login, a device causes a Bluetooth device (i.e., Bluetooth or short-range wireless circuitry) in the device to become discoverable such that the Bluetooth device will appear when performing device scanning, and will assign the University ID number as the Bluetooth device name. That is, the device name, which may be a generic name or a network address, is replaced with a user-based unique ID, such as a University ID, email, name, or other identifier. As used herein, such an "identifier" is merely referred to as a user identifier (user ID). To retrieve the name of a remote Bluetooth device or students' smartphones, the requesting host or the professor's smartphone uses knowledge of the remote device's Bluetooth Device Address and the establishment of a logical link with it.

Figure 6:
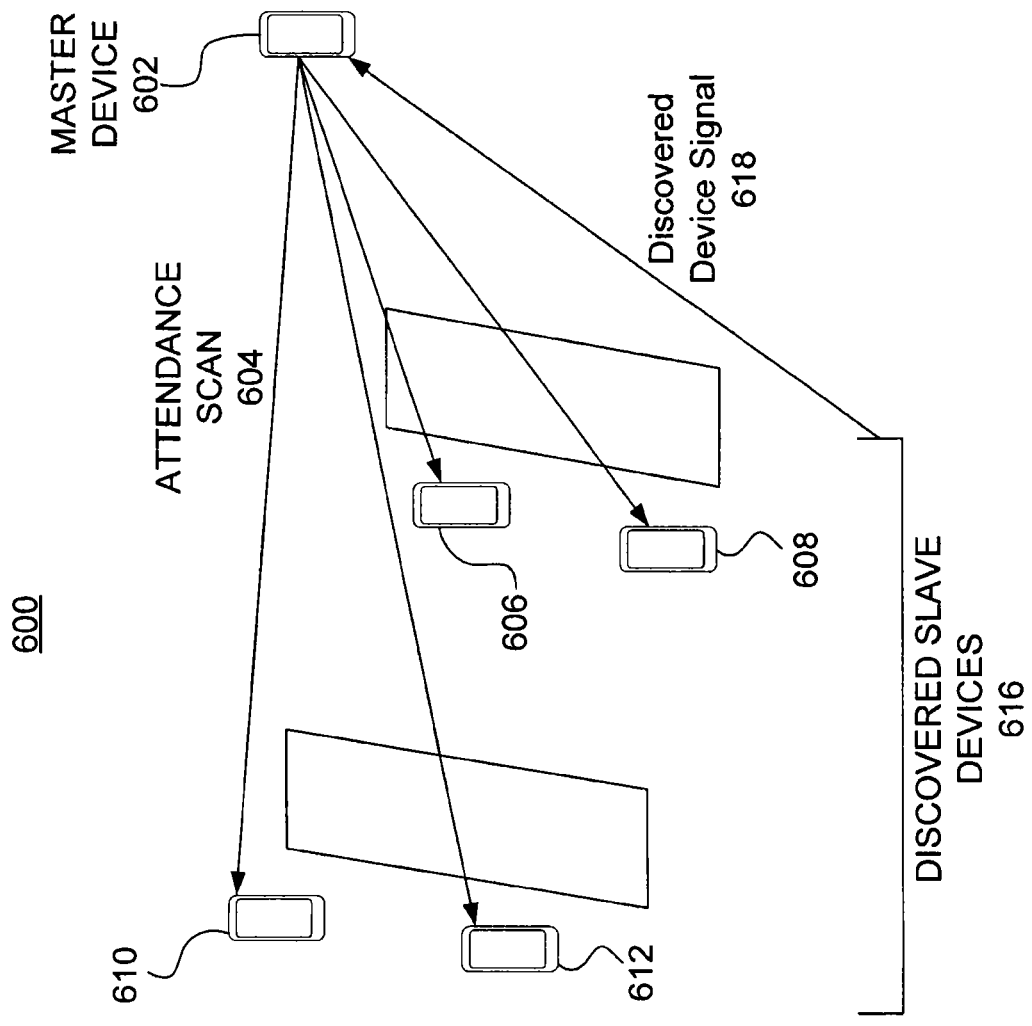
FIG. 6 illustrates an exemplary attendance system.

FIG. 6 is an example Bluetooth-based attendance scanning system 600. In FIG. 6, a Bluetooth-enabled smartphone master device 602 transmits an attendance scan signal 604 throughout, e.g., a classroom, which is received by a plurality of Bluetooth-enabled smartphones slave devices 606, 608, 610, 612 respectively belonging to a plurality of students. The master device 602 discovers slave devices 606-612 using the attendance scan signal 604. Each of the slave devices 606-612 (i.e., the discovered devices 616) sends a discovered device signal 618 to the master device 602.

Figure 7:
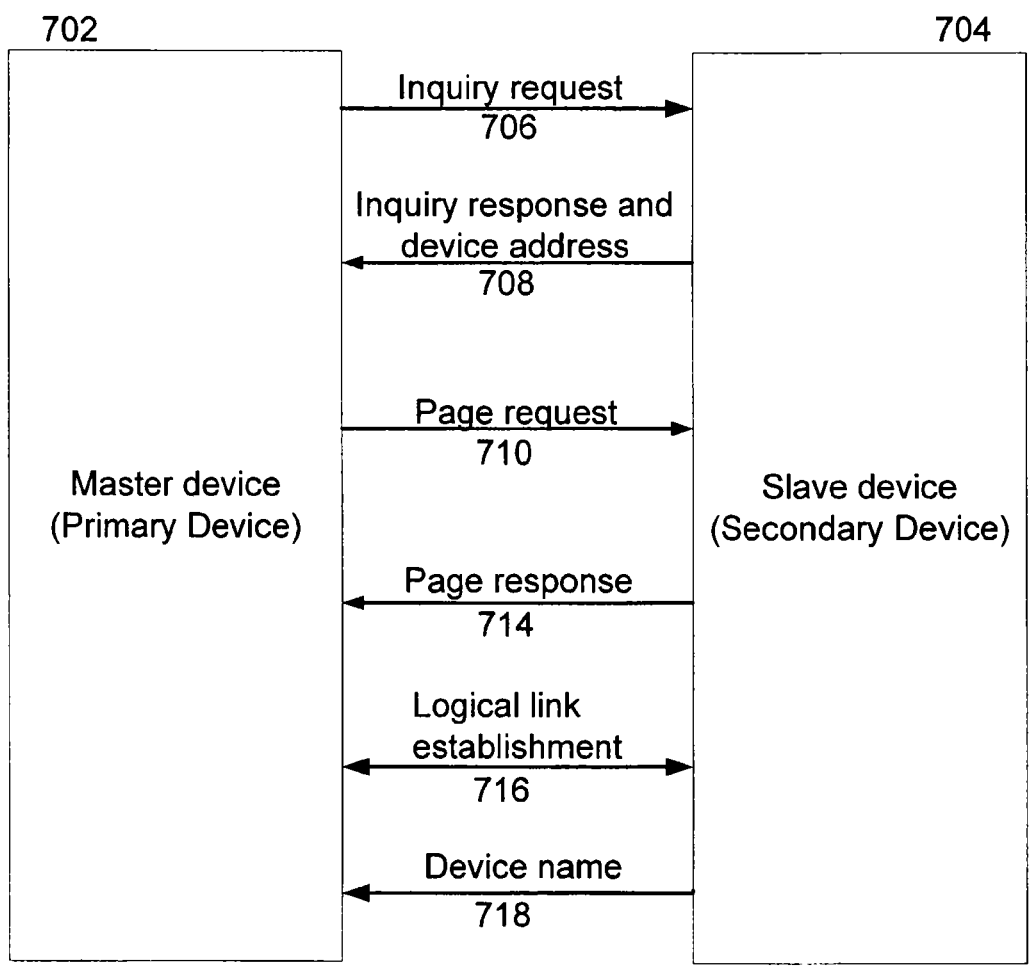
FIG. 7 is a diagram illustrating an exemplary attendance scan operation.

FIG. 7 illustrates an example attendance scan operation 700 between a master Bluetooth smartphone device (e.g., a primary device) 702 a slave Bluetooth smartphone device 704 (e.g., a secondary device). The master smartphone 702 sends a Bluetooth inquiry request signal 706 to the slave smartphone device 704 of the student. The slave Bluetooth smartphone 704 sends back an inquiry response and Bluetooth address signal 708 to the master device 702.

The master device 702 sends a page request 710 to the slave device 704, and the slave device 704 sends page response signal 714 to the master device 702. A Bluetooth logical link 716 is established between the master smartphone 702 and the slave smartphone 704, and a Bluetooth name 718 is sent from the slave device 704 to the master device 702. A response to, e.g., a question may be appended to the Bluetooth name. This particular implementation is discussed in more detail below. Otherwise, the process illustrated in FIG. 7 can be accomplished without performing pairing or establishing a communication channel between the devices.

It is not necessary in exemplary implementations to establish a communication link between the devices, as aspects of this disclosure can obtain and record attendance information through scanning of device names using a short-range wireless technology (e.g., scanning of Bluetooth names) without requiring a network to be established between devices using the short-range wireless technology.

The address of the remote device may be acquired through a device inquiry. A Bluetooth device that tries to find other nearby devices is known as an inquiring device and actively sends inquiry requests. Bluetooth devices that are available to be found are known as discoverable devices and listen for these inquiry requests and send responses. The inquiry response packet contains a Bluetooth Device Address of a responding device.

The procedure for logical link establishment is very similar to the procedure for device inquiry. A host wishing to establish a logical link with a remote device sends page requests. Each Bluetooth device is configured to periodically scan and respond to any incoming requests. Depending on the configuration, devices may either listen continuously, at least once every 1.28 seconds, or at least once every 2.56 seconds. After that the logical link will be established and can be used to retrieve the remote device's Bluetooth Device Name.

As discussed above, aspects of this disclosure do not require pairing and networking between devices. Pairing is a process used to securely establish a network connection between devices, and generally requires user interaction to complete. Pairing generally allows for a limited number of slave devices to join a network created by a master device.

In view of exemplary implementations of this disclosure, a system frequently re-scans for Bluetooth devices instead of establishing a network with/between them, without needing to know a number of devices joining the network and without requiring an authentication process for connection. Aspects of this disclosure can thus benefit from the mere discovery of nearby devices, representing available students, and not further requiring pairing or networking. However, such pairing or networking could still nonetheless be provided to introduce further functionality or additional features, without detracting from the scope of this disclosure. Such networking could also be provided by a different wireless connection other than the short-range wireless connection used for attendance scanning and the different connections can be simultaneously or synchronously.

Exemplary aspects of this disclosure can benefit from a frequent scan for students' devices so that no one is excluded from attendance and to provide accurate real-time logs of students' availability or being present in class. On the other hand, continuously scanning can deplete participants' smartphone's batteries quickly. Thus, a careful selection of scanning frequency is considered.

Estimating an expected time to complete inquiry and logical link establishment procedures is rather difficult in Bluetooth since it depends on a number of devices present. Nevertheless, some previous works claim connection times of about 2 seconds between devices previously unknown to each other, while others claim 4-12 seconds, 5.76 seconds, and worst case times of 23 seconds. To address timing concerns, aspects of this disclosure are directed to performing attendance scanning about every 30 seconds through the re-initiation of the inquiry and logical link establishment procedures. However, other times can be predefined or established while in use by a user.

Figure 8:
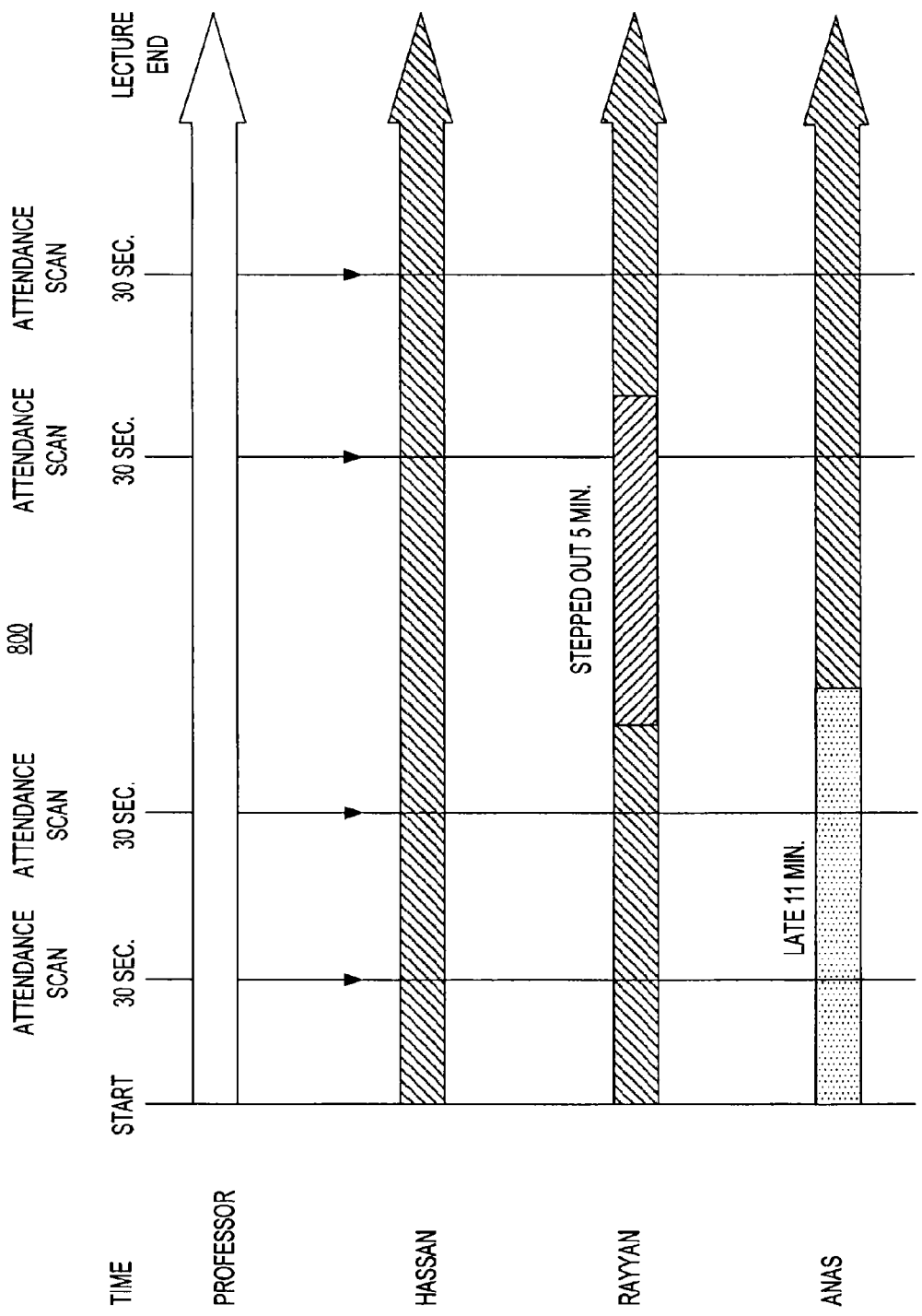
FIG. 8 is a chart illustrating an exemplary real-time attendance scan operation.

FIG. 8 is an example of a real-time attendance scan session, and an exemplary display of data recorded by a master device. According to FIG. 8, an attendance scan is performed periodically about every 30 seconds by the professor's smartphone to scan the presence of three example students, Hassan, Rayyan, and Anas.

In the example of FIG. 8, student Hassan is present throughout the session. Student Rayyan steps out for 5 minutes, and student Anas arrives 11 minutes late to the session. The data illustrated in FIG. 8 can be stored in the master device's memory as a table or other data, and is accessible as history or a record. The data can also be transmitted to a remote server, or student-specific information can be emailed or otherwise transmitted to the student for student confirmation/review.

Figure 9:
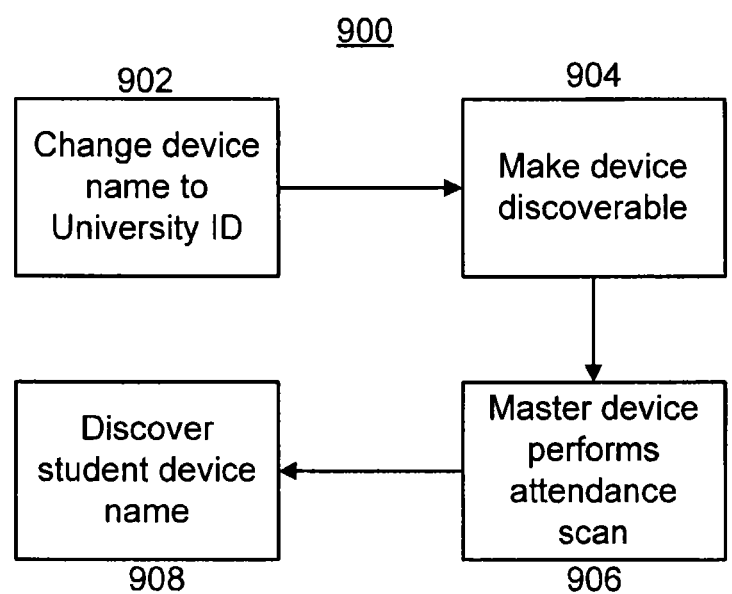
FIG. 9 is a flowchart of an exemplary attendance scan process.

FIG. 9 is a flowchart of an algorithm 900 that includes algorithmic steps 902-908. In step 902, a device name (i.e., the name of a slave device upon login) is changed to a university ID or other user ID. In step 904, a Bluetooth device of the slave device is made discoverable. In step 906, a master device performs an attendance scan, and in step 908, the master device discovers a student's device name via a corresponding response from the slave device that includes the device name (i.e., the university ID). In one implementation, the university ID may be a specific, unique number or alphanumeric string assigned to students by a University, and may include or be an email address, phone number, or other user ID. On the other hand, if no such authority is present in another implementation, the device name can utilize another recognizable name or email address to allow the master device and/or the professor to associate the device name with a particular student or participant.

Platform Test

While one design implementation of the teachings of this disclosure supports a Bluetooth-based smartphone platform, and supports interoperability between platforms, the exemplary implementation discussed herein is on an Android 4.0 platform. This is merely exemplary, and other platforms can be utilized, such as iOS, by APPLE. Android is an open source mobile operating system developed by Google Inc. of Mountain View, Calif., which utilizes a Software Development Kit (SDK) based on Java Framework, and also has a SQLite database management system. Herein, the methods and classes used to implement an exemplary attendance scan process are described via an exemplary Android implementation.

Figure 10:
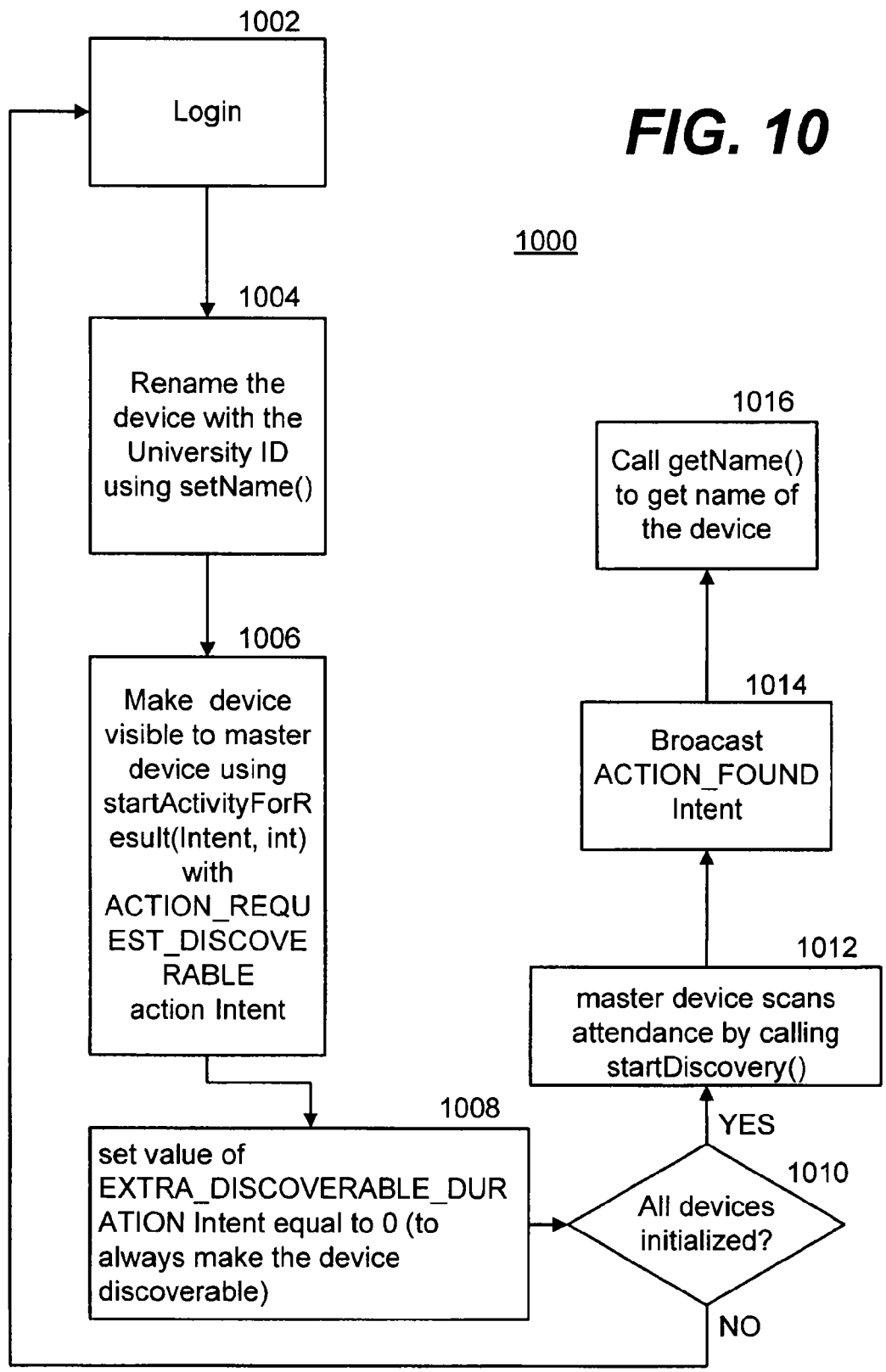
FIG. 10 is a flowchart of an implementation of an exemplary attendance scan process on a mobile operation system platform.

FIG. 10 is a flowchart 1000 showing the steps of an exemplary Android implementation. In step 1002, a user logs into the application using the user's University ID or another user ID. In step 1004, the Bluetooth device is renamed using the University ID of the user by running a setName( ) procedure. In step 1006, the Bluetooth device is made visible to a master device using a method startActivityForResult(intent, int) with ACTION_REQUEST_DISCOVERABLE action intent. In step 1008, to always make the Bluetooth device discoverable, the value of EXTRA_DISCOVERABLE_DURATION intent is set equal to 0. These steps 1002-1008 may be performed on other Bluetooth devices by other users and may be repeated. Also, the login step 1002 may be initiated by a user via a touchscreen interface of a mobile device, where the following steps are performed without further user input or without requiring further user input.

In step 1010, a condition of whether all devices are initialized is checked. Specifically, the professor may ask his students to verify they have logged into their respective applications. If the devices are otherwise networked together via WiFi or another network, the master device can be provided with corresponding data from the slave devices as to whether the slave devices have been initialized. Otherwise, when no network connection is established, the professor may simply ask the students to verify they have logged into their respective applications, thereby also prompting the professor in be informed of any connectivity or technical issues that may require the examiner to manually adjust the attendance log to accurately reflect attendance. In some cases, whereas the steps 1002-1008 and 1012-1016 are device-algorithm steps, the step 1010 may be performed as a non-algorithmic step (i.e., it is performed by a user).

If the condition is met or if the professor does not verify the present students have logged in, then in step 1012 the master device scans attendance by calling startDiscovery( ). This step 1012 and the following steps may be performed during, before, and/or after the steps 1002-1008 and/or 1010 by the master device. That is, the master device may begin scanning when (in response to) the professor logs into the master device, whereas the slave devices perform their respective steps when (in response to) the students log into their respective slave devices. The step 1012 and the following steps may also be delayed by a preset time with respect to the professor logging in so as to allow the professor to initialize his login process prior to an actual start of class time, where the attendance scan can be performed at the actual start of class time, or to allow the attendance scan to occur during an initial, middle, or later portion of the class time while the professor is teaching. In step 1014, ACTION_FOUND intent is broadcast from the master device, and in step 1016 the name of the Bluetooth device is obtained by calling getName( ) procedure.

Once the user logs into the application using his University ID, the application will rename the Bluetooth device with the University ID using the method: setName (String name) which sets the Bluetooth device name of the local Bluetooth adapter. Since the valid Bluetooth names are a maximum of 248 bytes using UTF-8 encoding, using the University ID may be preferable than using the student name. However, as discussed above, other names or IDs can be utilized instead of a pre-registered or assigned University ID in other implementations.

Once the Bluetooth device name is set, the application will enable the Bluetooth device to be visible (discoverable) to the master device using a method startActivityForResult(Intent, int) with the ACTION_REQUEST_DISCOVERABLE action Intent. This will issue a request to enable discoverable mode through the system settings (without stopping the application). An embodiment of the present disclosure sets the device to become always discoverable by adding the EXTRA_DISCOVERABLE_DURATION Intent extra with value equal to 0. Upon logoff, the Bluetooth device's discoverability may be reverted to off, depending on the user's preferred settings. Additionally, the Bluetooth device's discoverability may be turned off by selecting an "idle" option, consistent with GUI 500 of FIG. 5.

In one implementation, once all slave devices have been initialized (i.e., once the professor verifies the students are logged in), the master device performs the attendance scanning process by calling the method startDiscovery( ). However, this can be performed before, during, or after initialization of the slave devices. The discovery process usually involves an inquiry scan of about 12 seconds, followed by a page scan of each found device to retrieve its Bluetooth device name. An implementation registers a BroadcastReceiver for the ACTION_FOUND Intent in order to receive information about each device discovered. For each device, the system will broadcast the ACTION_FOUND Intent. This Intent carries the extra fields EXTRA_DEVICE and EXTRA_CLASS, containing a BluetoothDevice and a BluetoothClass, respectively. Finally the name of the Bluetooth device can be obtained using the method getName( ).

Attendance logging has been a distracting and time consuming process facing educators throughout modern education institutions. One implementation of this disclosure provides an autonomous real-time attendance logging system using off the shelf smartphones. A well-designed user interface (UI) is also provided for limiting user interaction, as is a novel frequent scanning scheme utilizing Bluetooth technology for autonomous attendance recording. Certain implementations may be implemented on an Android platform.

Various implementations of this disclosure make it possible to automate an attendance recording process through the use of wide spread and proliferated technology, i.e., a smartphone. Utilizing Bluetooth technology or another short-range wireless communication technology, which comes built-in to smartphones, interoperable and support for multiple platforms can be provided. Implementations other than those specifically discussed herein can be implemented on iOS, Windows Phone, and BlackBerry smartphones. Also, exemplary implementations can provide the possibility of adapting the master device transmission power to control the coverage of the signal, and to avoid incorrectly logging class-registered students who are intentionally or unintentionally physically outside the class premises. While this problem is currently addressed by a manual head count, the present disclosure increases the degree of automating attendance tracking providing a seamless attendance procedure to a classroom.

Response Tracking

As in the above-discussed implementations, exemplary implementations of response tracking are discussed herein with respect to Bluetooth. However, other short-range communication technologies can be utilized.

The master device can include a presentation software module, such as Microsoft PowerPoint, and can connect to another device, such as a laptop including Microsoft PowerPoint. The software module is used to display a plurality of answers of the students to a quiz question. The quiz question is sent by the master device to the slave devices of the students. The master device may connect to a server to download quiz questions, but the slave devices of the students are not required to connect to a server or an infrastructure network.

That is, in exemplary implementations, a question is displayed to students/participants via a monitor or projector. The question is not necessarily retrieved from a server or another network—the professor may simply type the question on a display. The question may also be transmitted to other devices through a network connection, if available.

Answers (i.e., responses) to the question can be sent to the master device in a manner similar to the descriptions provided above and discussed in more detail below via short range wireless communication signals, such as Bluetooth signals. The master device, upon receipt of the signals, can display the results on the master device or a connected device as illustrated in FIG. 1. The professor may establish a time window for students to submit answers.

The short range wireless communication transmissions discussed herein may include Bluetooth protocol layers including LMP, L2CAP, and SDP. LMP or the Link Management Protocol may be used for set-up and control of radio links between the master and the slave devices. L2CAP or the Logical Link Control and Adaptation Protocol may be used to multiplex multiple logical connections between the master and the slave devices using different higher level protocols or may also provide segmentation and reassembly of on-air packets.

L2CAP may also provide packets with a payload configurable up to 64 kB, with 672 bytes as the default and 48 bytes as the minimum mandatory supported MTU. The Service Discovery Protocol or SDP allows a device to discover services offered by other devices, and their associated parameters.

The devices of, e.g., FIG. 1 can share a clock and master/slave roles can be switched and shared, by agreement of users or otherwise, to allow a master to become a slave and vice versa. This can also be the case during the course of attendance tracking, where multiple slave devices in an audience can be turned into remote master devices that allow for a more distributed response-retrieval system for tracking attendance or responses. This can make the system more efficient by establishing network connectivity only between the distributed master devices, whereas network connectivity is not necessary for other slave devices. Communication between various devices can also be limited to the Bluetooth communication protocols where pairing is not performed.

An example clock interval/pulse in Bluetooth can be about 312.5 microsecond intervals. A time slot may be defined as two clock pulses or 625 microseconds. Two slots take 1250 µs. According to exemplary implementations, in the single-slot case, packets from the master device can transmit in even slots and receive in odd slots. The slave devices can receive Bluetooth messages in the even slots and transmit in the odd slots, by taking turns. For example, according to certain examples, Bluetooth packets may be 1, 3, or 5 slots long.

The master device may use a broadcast mode of the Bluetooth protocol to disseminate a quiz question to Bluetooth receivers of the slave devices. A corresponding broadcast message may include indicators to identify specific ones of the slave device to be addressed. In this case, the other slave devices can be configured (e.g., programmed) to ignore the message.

Figure 11:
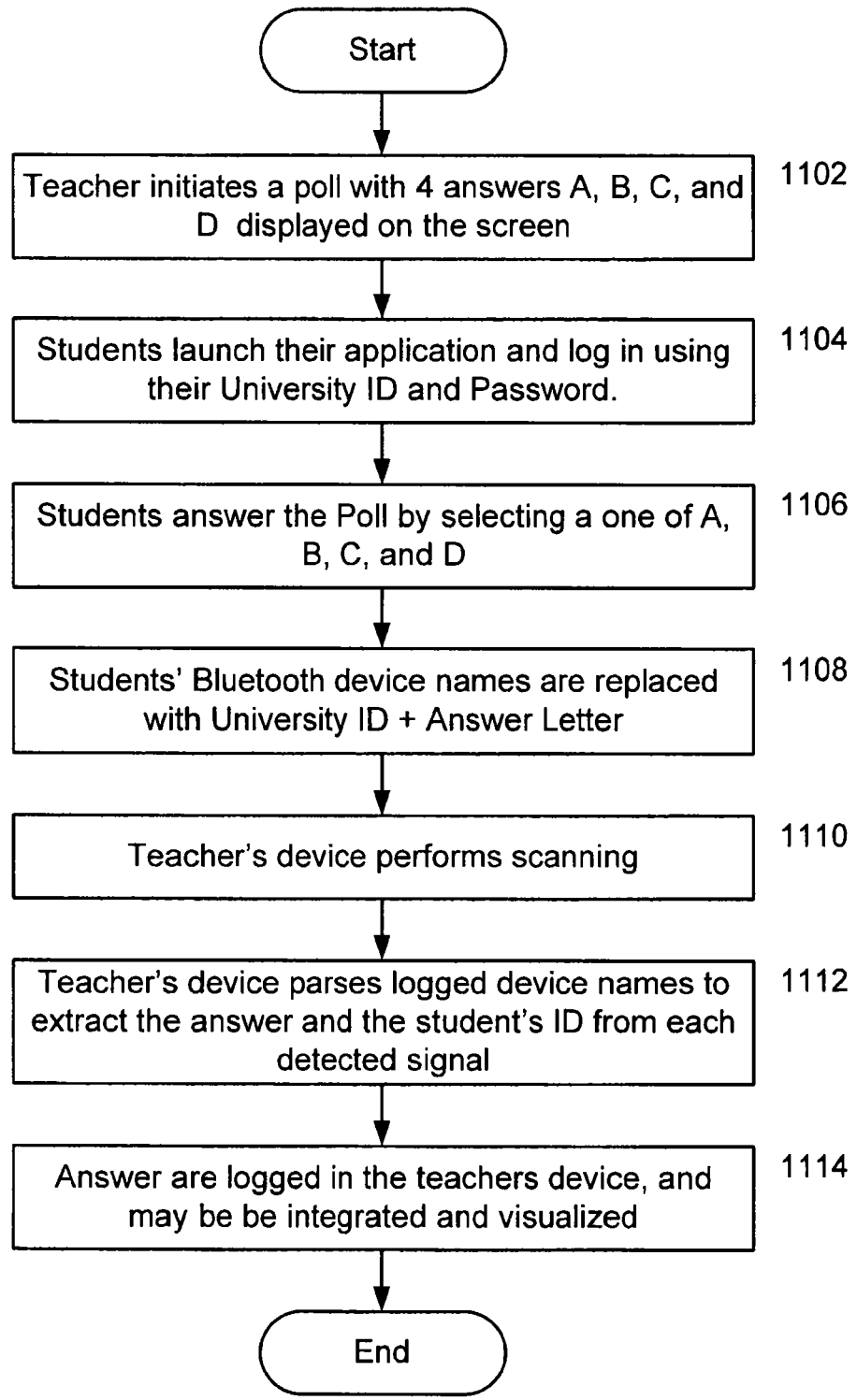
FIG. 11 is a flowchart of an example process to use smartphones and short-range wireless technology for collecting students' responses.

FIG. 11 is a flowchart of an algorithm for receiving responses to a question. In step 1102, a teacher (i.e., with a master device) initiates a poll with 4 answers displayed on a screen (A, B, C, or D). In step 1104, students launch their applications on their slave devices and login using their University ID and Password or other credentials consistent with the previously discussed implementations.

In step 1106, students answer a poll by selecting a choice among A, B, C, and D. In step 1108, Bluetooth device names of the slave devices are replaced with corresponding University IDs and a response (i.e., an answer letter). In step 1110, the teacher's device performs scanning of signals. In step 1112, the teacher's device parses logged device names to extract the answer and the student's ID from each signal detected. In step 1114, the answer is logged in the teacher's device to be integrated and visualized by Microsoft PowerPoint or other presentation software.

In some implementations, the functionality provided via FIG. 11 is provided in an application (i.e., a software application executed by a circuitry) in a smartphone. This functionality is provided together with or separate from the functionality discussed above regarding attendance tracking.

Figure 12:
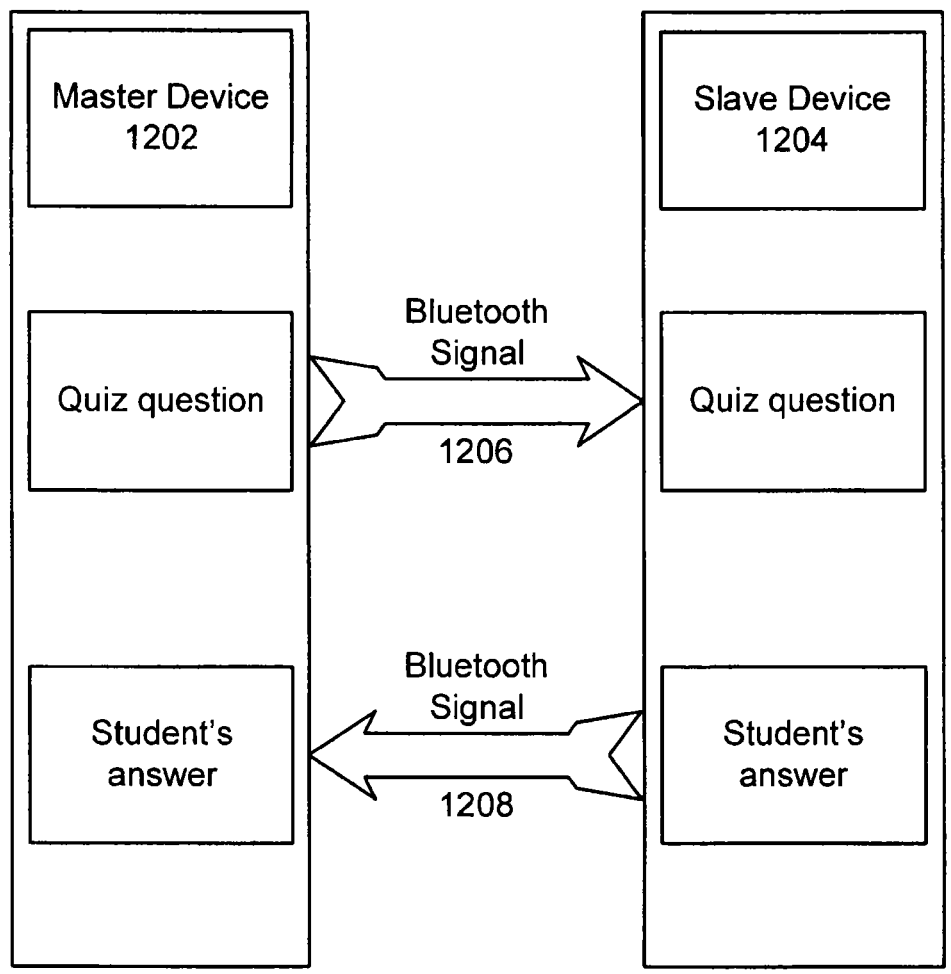
FIG. 12 is a block diagram that illustrates receiving responses to the quiz questions.

FIG. 12 is a block diagram that illustrates the communication shows how the method of the present disclosure sends and receives quiz questions to and from smartphones, using Bluetooth signals. Regardless of forming a Bluetooth network connection or performing pairing, a master device 1202 transmits a quiz question to a slave device 1204 via a Bluetooth signal 1206. This transmission can make use of transmitting data via the device name of address fields of the Bluetooth protocol to avoid Bluetooth pairing. A response to the question is sent from the slave device to the master device via a Bluetooth signal 1208 in a similar manner. The response can then be displayed as discussed above.

Further, the "quiz question" output from the master device can merely be a trigger for causing the slave devices to output a response. That is, with reference to FIG. 6, a question scan (similar to the attendance scan) can be output from the master device, where the question itself is not sent to the slave devices, but is rather merely displayed visually to the students.

Figure 13:
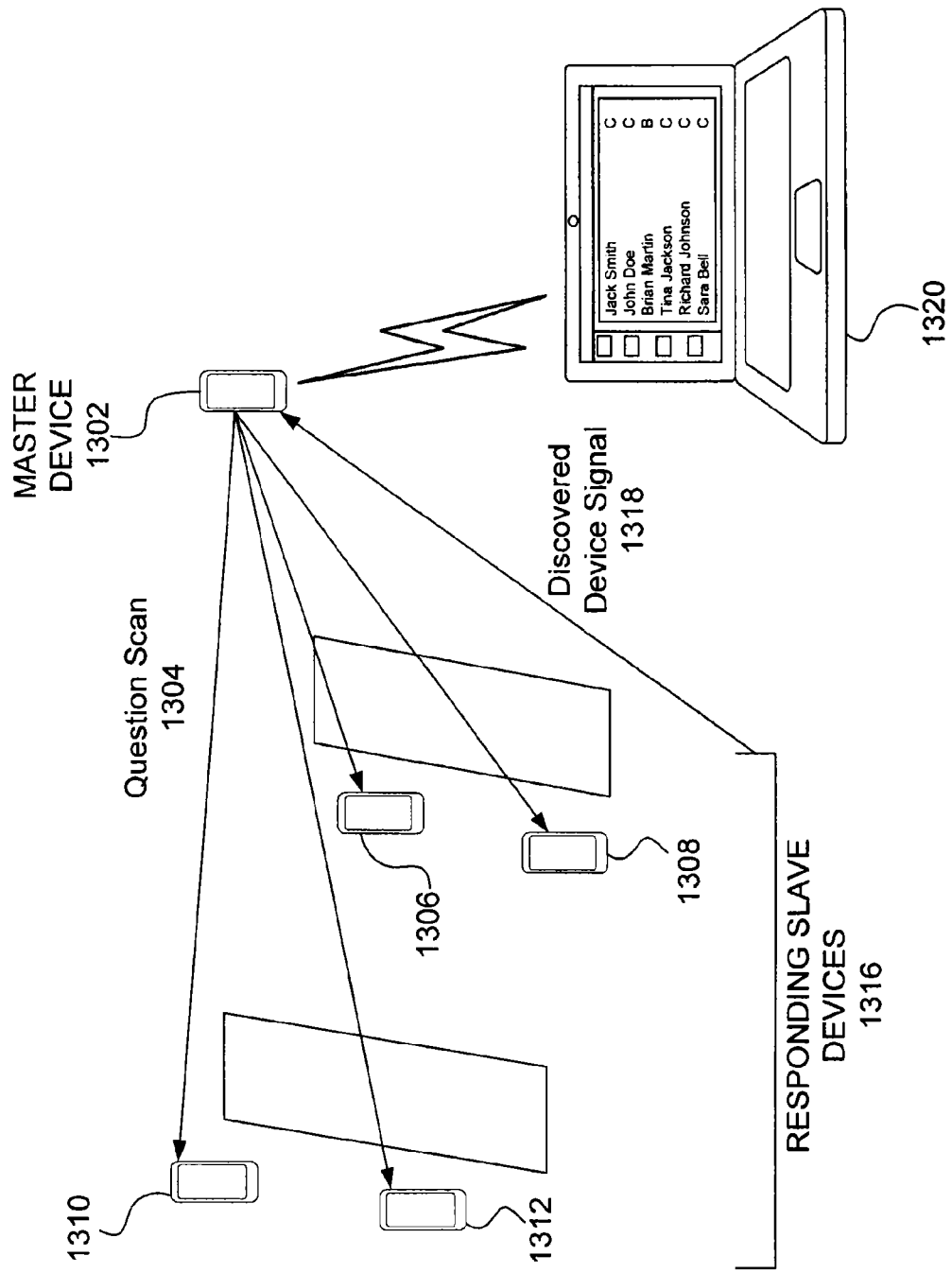
FIG. 13 is a block diagram that illustrates displaying the responses on a screen.

In FIG. 13, a master device 1302 is connected to another device 1320, e.g., a laptop computer. The master device 1302 transmits a question scan signal 1304, which may or may not include the question, throughout, e.g., a classroom, which is received by a plurality of Bluetooth-enabled smartphones slave devices 1306, 1308, 1310, 1312 respectively belonging to a plurality of students. The master device 1302 discovers slave devices 1306-1312 using the question scan signal 1304. Each of the slave devices 1306-1312 (i.e., the discovered devices that are responding to the question 1316) sends a discovered device signal 1318 to the master device 1302 that includes an answer. These answers can be displayed via the another device 1320 for classroom purposes.

Figure 14:
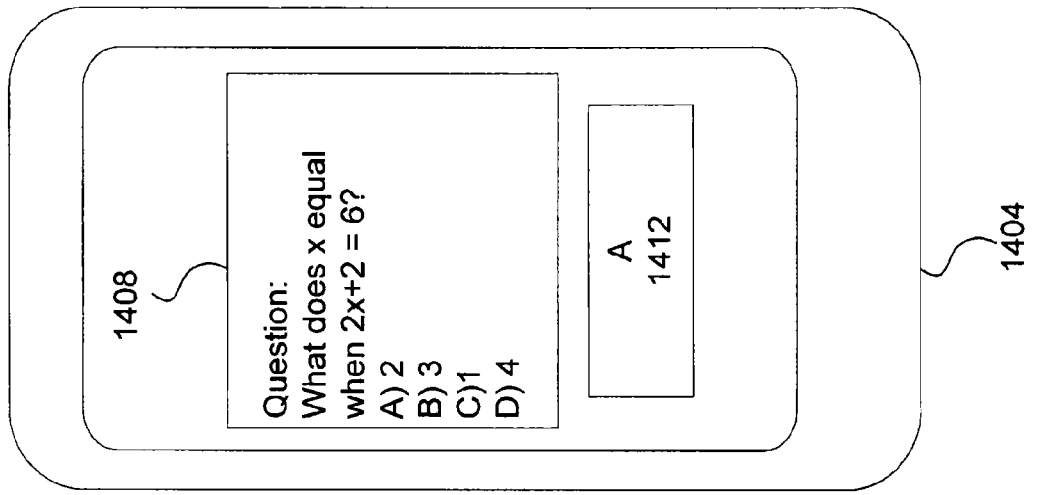
FIG. 14 is an illustration of an exemplary GUI for a question/response system.
Figure 14:
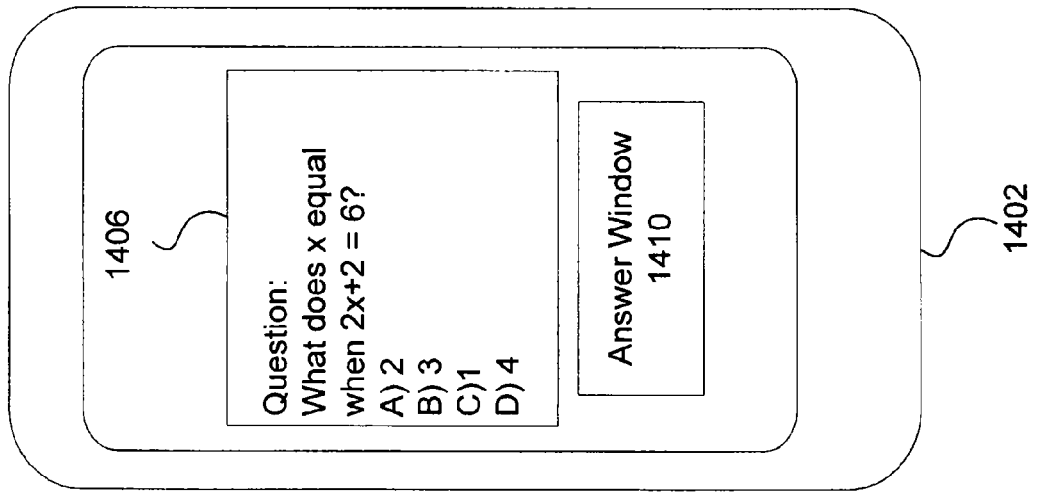

FIG. 14 illustrates exemplary graphic user interfaces. A master device 1402 includes a question window 1406 and an answer window 1410. A slave device 1404 includes a question window 1408 showing the same question as on the question window 1406. The slave device 1404 further includes an answer window 1412 in which the student enters the answer to the question in question window 1408.

Figure 15:
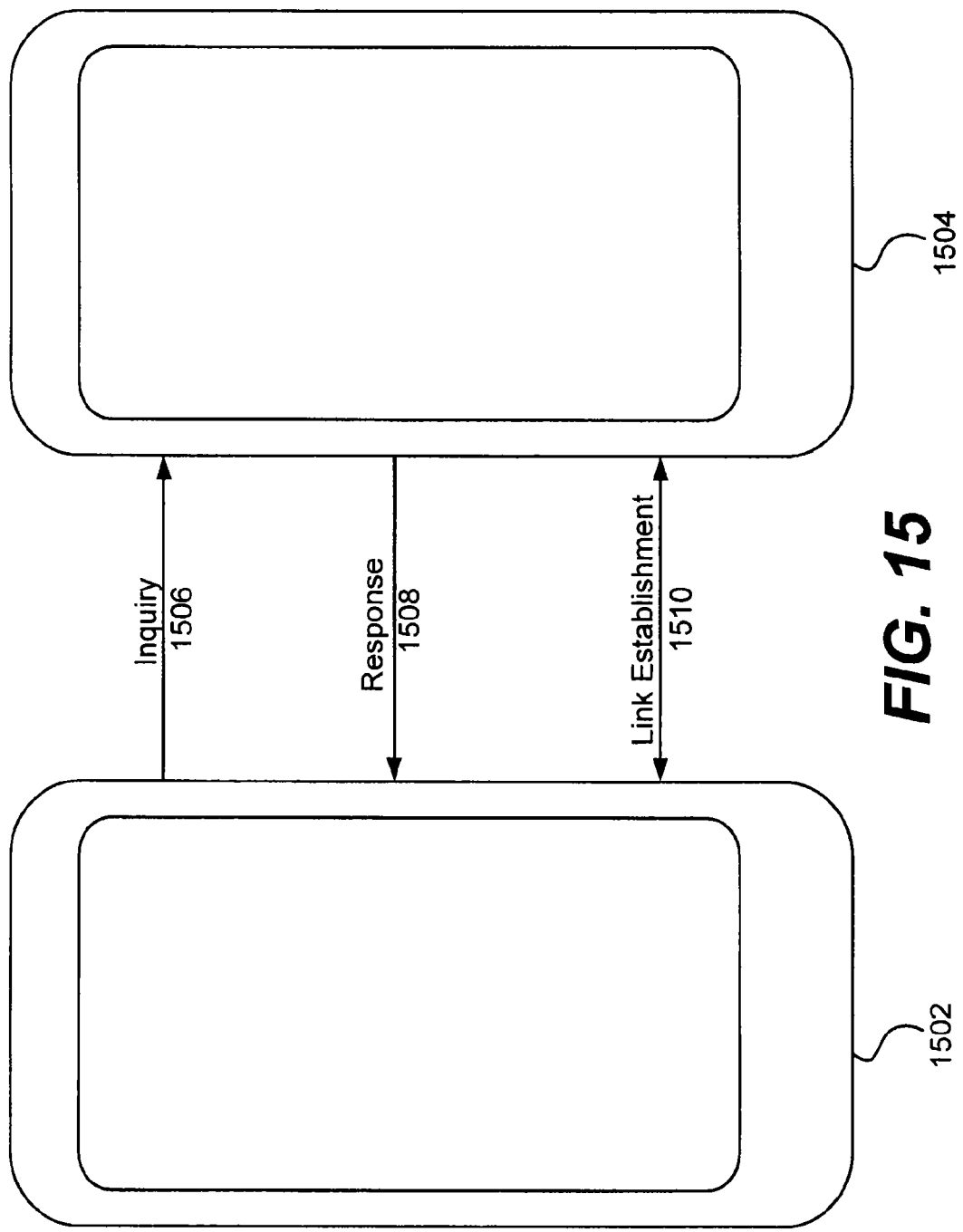
FIG. 15 is a block diagram that illustrates how short-range wireless communication links are established between a device of a professor and a device of a student.

FIG. 15 illustrates a master device 1502 transmitting an inquiry signal 1506 to a slave device 1504. The slave device 1504 then answers back with a response 1508. The master device 1502 receives the response 1508 and link establishment 1510 is performed by the master and slave devices to establish a Bluetooth link. In accordance with the above discussions regarding FIGS. 7, 9, and 10, the response may include a user ID and a response to a question that is appended to the user ID.

Hardware and Software Implementations

The various steps discussed above in and illustrated in the figures can be performed in different orders and the various loops can be performed simultaneously based on processing capabilities of an implementation. Accordingly, various implementations are possible in light of the teachings of this disclosure.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions. For example, as discussed above, the functionality of the master device can be distributed across a plurality of different devices, including use of the functionality of a slave device as a master device in some circumstances.

Reference has been made herein to an "application," which refers to a software program that may transform an otherwise conventional device, such as a smartphone, into a special-purpose computing device to perform the advantageous features described herein. The application may be downloaded in advance from a server and installed on the various devices. Alternatively, the application may be provided by a master device to slave devices over a short-range communication.

The application of the present disclosure can be implemented in Java. Exemplary implementations can use the 802.15.1 Bluetooth core specification with a maximum bandwidth of 1 Mbit/sec. However, other protocols can be utilized without departing from the teachings of this disclosure. In one example, Bluetooth Low Energy (Bluetooth LE; Bluetooth Smart; Bluetooth 4.0) can be utilized.

Figure 16:
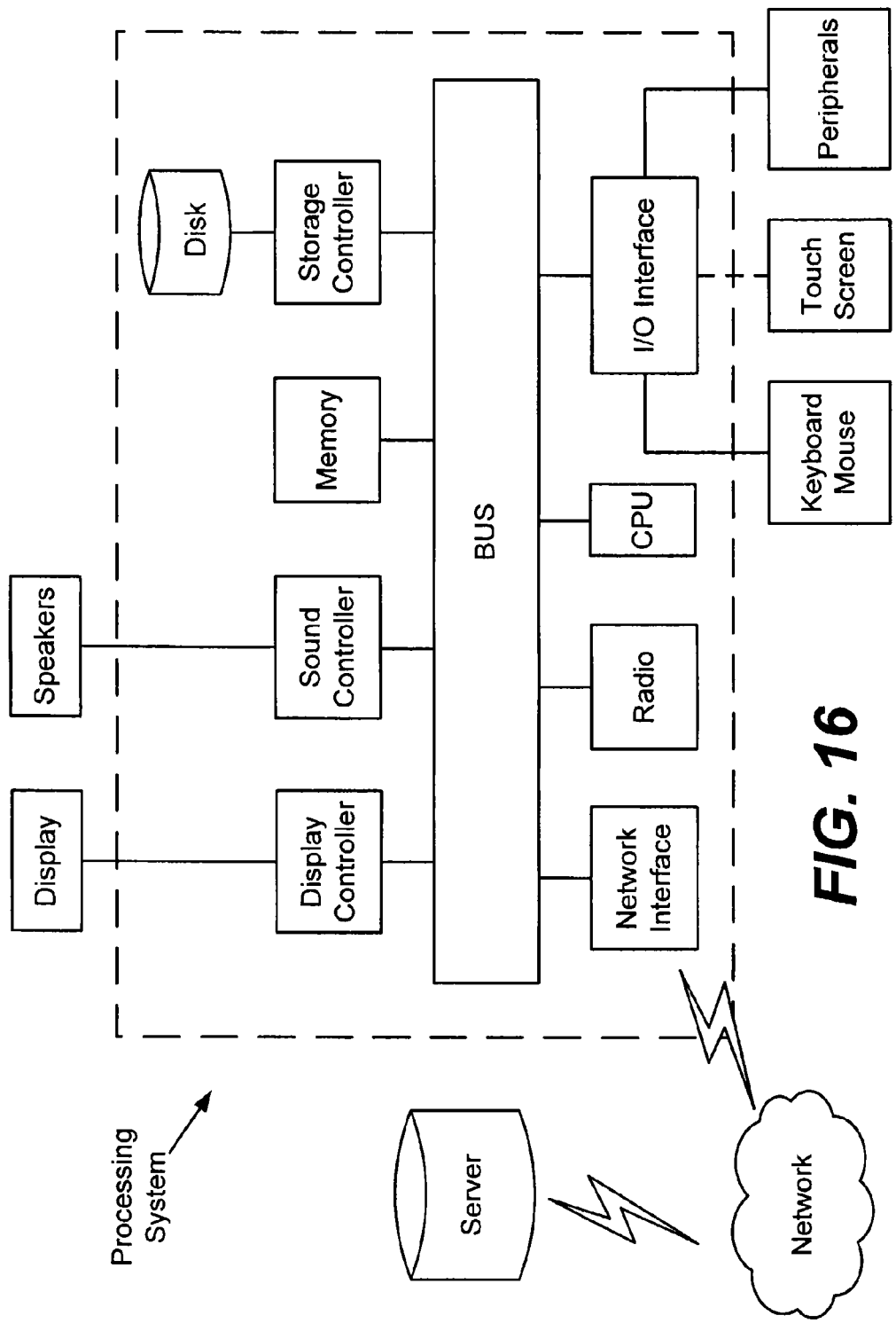
FIG. 16 is a block diagram of an exemplary processing system.

FIG. 16 illustrates an exemplary processing system (i.e., an exemplary processor, circuitry, or mobile/personal/master/slave device). One or more of such processing systems can be utilized in or to execute one or more algorithms, or portions thereof, or one or more architecture blocks, or portions thereof, in accordance with the descriptions provided herein.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a display (e.g., an LCD or an OLED monitor). The display controller preferably includes at least one graphic processing unit, which can be provided by a plurality of graphics processing cores, for improved computational efficiency. The display controller or portions thereof can also be incorporated into the CPU.

Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

The I/O interface can also be connected to a mobile device, such as a smartphone, a portable storage device, and/or a global position system (GPS) device or another positioning device. The I/O interface can include a Universal Serial Bus (USB) hub, Bluetooth circuitry, Near Field Communication (NFC) circuitry, or other wired or wireless communication circuits. The I/O interface can also be connected to one or more networking devices. For example, Bluetooth circuitry or other short-range wireless communication circuitry can be coupled to the I/O interface as a removable device through, e.g., a USB port.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

A radio can be included, either as a separate component or part of the network interface. The radio can incorporate various wireless communication technologies as separate circuits or shared circuitry, and the technologies can incorporate LTE, GSM, CDMA, WiFi, Bluetooth, NFC, infrared, FM radio, AM radio, ultrasonic, and/or RFID circuitry. The radio may function as a network controller for communication with the network, and the network can take various forms.

The processing system may be a networked desktop computer, terminal, or personal device, such as a tablet computer or a mobile phone. The network can include various wired and wireless communication channels. The databases or storage components discussed herein can be a hardware component of a remote server, and the server can include components similar to or the same as the processing system. These devices can communicate via the network. The server can provide instructions or data to the processing system via the network.

Suitable software, such as an operating system or an application, can be tangibly stored on a computer readable medium of a processing system in a non-transitory manner, including in the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as at least one or more of a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device in a non-transitory manner, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory manner in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

EXEMPLARY IMPLEMENTATIONS

Attendance Tracking
A. A system comprising:
a first device including:
first communication circuitry configured to communicate with a second device by a short-range wireless protocol; and
first control circuitry configured to:
activate the first communication circuitry so that the first communication circuitry is detectable by the second device via the short-range wireless protocol,
set a device name for the first communication circuitry to a user identifier that is specific to a user of the first device,
receive a scan signal from the second device via the first communication circuitry and the short-range wireless protocol, and
transmit the user identifier to the second device via the first communication circuitry and the short-range wireless protocol in response to receiving the scan signal,
the second device including:
second communication circuitry configured to communicate with the first device by the short-range wireless protocol; and
second control circuitry configured to:
activate the second communication circuitry to transmit the scan signal to the first device,
receive the user identifier of the first communication circuitry of the first device via the second communication circuitry and the short-range wireless protocol in response to the first device receiving the scan signal and transmitting the user identifier to the second device, and
store, in memory circuitry of the second device, the user identifier in a log to record a presence of the user of the first device within a range between the first and second devices of the short-range wireless protocol.

B. The system according to A, further comprising:
a plurality of slave devices, each of the slave devices including the first communication circuitry and the first control circuitry of the first device, wherein
the second device is a master device that executes an attendance scan that receives the user identifier of each of the slave devices in response to executing the attendance scan, and the second device records, in the memory circuitry of the second device, an attendance log to record the presence of users of the slave devices based on received user identifiers and a time at which each of the received user identifiers is received.

C. The system according to B, wherein the second control circuitry of the second device is configured to:
display, on a display of the second device, a graphical user interface for a user of the second device to log into the second device to activate the attendance scan and to access registration records that include a list of expected users that are expected to be detected via the attendance scan,
compare the received user identifiers with the list of expected users,
generate an attendance status of the expected users, and
record, in the memory of the second device, the attendance status of the expected users in the attendance log.

D. The system according to C, wherein the second control circuitry of the second device is configured to display, on the display of the second device, a chart illustrating the attendance status of the expected users.

E. The system according to C, wherein the second control circuitry of the second device is configured to display, on the display of the second device, a graphical user interface for the user of the second device to manually edit the attendance log.

F. The system according to A, wherein the short-range wireless protocol is a Bluetooth protocol.

G. The system according to A, wherein no network is established between the first and second devices via the short-range wireless protocol.

H. The system according to A, wherein the second device requests the user identifier from the first device periodically.

I. The system according to A, wherein the second device requests the user identifier from the first device based on a manual request by a user of the second device.

J. The system according to A, wherein each of the first and second control circuitry is configured to download and execute an application and authenticate usage of the application, such that each of the first and second control circuitry is not authorized or able to communicate with each other via the short-range communication protocol to perform an attendance scan process until authentication has been performed.

K. The system according to A, wherein:
the device name for the first communication circuitry is preset to a device-specific identifier; and
the first control circuitry is configured to set the device name for the first communication circuitry by replacing the device-specific identifier with the user identifier.

L. The system according to K, wherein the user identifier is a student identification number or an email address.

M. The system according to A, wherein the second control circuitry is configured to activate the second communication circuitry to transmit the scan signal to the first device every 30 seconds.

N. The system according to A, wherein the first control circuitry is configured to set a status of idle and to set a status of available, such that the status of idle results in the first control circuitry not transmitting the user identifier to the second device, and such that the status of available results in the first control circuitry transmitting the user identifier to the second device.

O. The system according to A, wherein the first and second devices are smartphones or tablets.

P. The system according to A, wherein the second control circuitry of the second device is configured to:
access a registration database of a course;
download registration records for the course from a remote server;
display a list of students enrolled in the course; and
display the list of students enrolled in the course together with an indication correlating the user identifier received form the first device with a student listed in the list of students enrolled in the course.

Q. The system according to Claim A, wherein the short-range wireless protocol is a protocol that utilizes communication circuitry based on: near-field communication (NFC), WiFi, infrared communications, ultrasonic signal generators, or radio-frequency identification (RFID) circuits.

R. A slave device comprising:
communication circuitry configured to communicate with a master device by a short-range wireless protocol; and
control circuitry configured to:
activate the communication circuitry so that the communication circuitry is detectable by the master device via the short-range wireless protocol,
set a device name for the communication circuitry to a user identifier that is specific to a user of the slave device,
receive a scan signal from the master device via the communication circuitry and the short-range wireless protocol, and
transmit the user identifier to the second device via the communication circuitry and the short-range wireless protocol in response to receiving the scan signal.

S. A method, comprising:
activating first communication circuitry of a first device so that the first communication circuitry is detectable by a second device via a short-range wireless protocol;
setting a device name for the first communication circuitry to a user identifier that is specific to a user of the first device;
activating second communication circuitry of the second device and transmitting a scan signal from the second communication circuitry to the first device via the short-range wireless protocol;
receiving the scan signal from the second device at the first communication circuitry via the short-range wireless protocol;
transmitting the user identifier from the first communication circuitry to the second device via the short-range wireless protocol in response to the receiving the scan signal;
receiving the user identifier of the first communication circuitry of the first device at the second communication circuitry via the short-range wireless protocol in response to the first device receiving the scan signal and transmitting the user identifier to the second device; and
storing, in memory circuitry of the second device, the user identifier in a log to record a presence of the user of the first device within a range between the first and second devices of the short-range wireless protocol.

T. A non-transitory computer-readable medium including executable instructions, which when executed by circuitry, causes the circuitry to execute the method according to S.

Response Tracking

A. A system comprising:
a first device including:
first communication circuitry configured to communicate with a second device by a short-range wireless protocol; and
first control circuitry configured to:
activate the first communication circuitry so that the first communication circuitry is detectable by the second device via the short-range wireless protocol,
set a device name for the first communication circuitry to a string that includes a user identifier that is specific to a user of the first device and a response to an inquiry, receive a scan signal from the second device via the first communication circuitry and the short-range wireless protocol, and transmit the device name, which includes the user identifier and the response, to the second device via the first communication circuitry and the short-range wireless protocol in response to receiving the scan signal, the second device including:

second communication circuitry configured to communicate with the first device by the short-range wireless protocol; and second control circuitry configured to:

activate the second communication circuitry to transmit the scan signal to the first device, receive the device name, which includes the user identifier and the response, of the first communication circuitry of the first device via the second communication circuitry and the short-range wireless protocol in response to the first device receiving the scan signal and transmitting the device name to the second device, and store, in memory circuitry of the second device, the user identifier and the response in a log to record the response of the user.

B. The system according to A, further comprising:

a plurality of slave devices, each of the slave devices including the first communication circuitry and the first control circuitry of the first device, wherein the second device is a master device that executes an inquiry scan that receives the user identifier and the response of each of the slave devices in response to executing the inquiry scan, and the second device records, in the memory circuitry of the second device, a response log to record the responses and user identifiers of users of the slave devices based on received user identifiers, responses, and a time at which each of the device names is received.

C. The system according to B, wherein the second control circuitry of the second device is configured to:

display, on a display of the second device, a graphical user interface for a user of the second device to log into the second device to activate the inquiry scan and to access registration records that include a list of expected users that are expected to be detected via the inquiry scan, compare the received user identifiers with the list of expected users, generate a status of the expected users in responding to the inquiry, and record, in the memory of the second device, the status of the expected users in the log.

D. The system according to C, wherein the second control circuitry of the second device is configured to display, on the display of the second device, a chart illustrating the status of the expected users.

E. The system according to C, wherein the second control circuitry of the second device is configured to display, on the display of the second device, a graphical user interface for the user of the second device to manually edit the log.

F. The system according to A, wherein the short-range wireless protocol is a Bluetooth protocol.

G. The system according to A, wherein no network is established between the first and second devices via the short-range wireless protocol.

H. The system according to A, wherein the second device transmits the inquiry to the first device via the short-range wireless protocol so that the inquiry is displayed to a user of the first device.

I. The system according to A, wherein the second device requests the device name from the first device based on a manual request by a user of the second device.

J. The system according to A, wherein each of the first and second control circuitry is configured to download and execute an application and authenticate usage of the application, such that each of the first and second control circuitry is not authorized or able to communicate with each other via the short-range communication protocol to perform a scan process until authentication has been performed.

K. The system according to A, wherein:

the device name for the first communication circuitry is preset to a device-specific identifier; and the first control circuitry is configured to set the device name for the first communication circuitry by replacing the device-specific identifier with the user identifier and the response.

L. The system according to K, wherein the user identifier is a student identification number or an email address.

M. The system according to A, wherein the second control circuitry is configured to activate the second communication circuitry to transmit the scan signal to the first device every 30 seconds.

N. The system according to A, wherein the first control circuitry is configured to set a status of idle and to set a status of available, such that the status of idle results in the first control circuitry not transmitting the user identifier and the response to the second device, and such that the status of available results in the first control circuitry transmitting the user identifier and the response to the second device as the device name.

O. The system according to A, wherein the first and second devices are smartphones or tablets.

P. The system according to A, wherein the second control circuitry of the second device is configured to:

access a registration database of a course;

download registration records for the course from a remote server;

display a list of students enrolled in the course; and display the list of students enrolled in the course together with an indication correlating the user identifier received form the first device with a student listed in the list of students enrolled in the course together with the response from the respective user.

Q. The system according to Claim A, wherein the short-range wireless protocol is a protocol that utilizes communication circuitry based on: near-field communication (NFC), WiFi, infrared communications, ultrasonic signal generators, or radio-frequency identification (RFID) circuits.

R. A slave device comprising:

communication circuitry configured to communicate with a master device by a short-range wireless protocol; and control circuitry configured to:

activate the communication circuitry so that the communication circuitry is detectable by the master device via the short-range wireless protocol, set a device name for the communication circuitry to a user identifier that is specific to a user of the slave device and a response to an inquiry, receive a scan signal from the master device via the communication circuitry and the short-range wireless protocol, and transmit the device name, which includes the user identifier and the response, to the second device via the communication circuitry and the short-range wireless protocol in response to receiving the scan signal.

S. A method, comprising:

activating first communication circuitry of a first device so that the first communication circuitry is detectable by a second device via a short-range wireless protocol;

setting a device name for the first communication circuitry to a user identifier that is specific to a user of the first device and a response to an inquiry;

activating second communication circuitry of the second device and transmitting a scan signal from the second communication circuitry to the first device via the short-range wireless protocol;

receiving the scan signal from the second device at the first communication circuitry via the short-range wireless protocol;

transmitting the device name, which includes the user identifier and the response, from the first communication circuitry to the second device via the short-range wireless protocol in response to the receiving the scan signal;

receiving the user identifier of the first communication circuitry of the first device and the response at the second communication circuitry via the short-range wireless protocol in response to the first device receiving the scan signal and transmitting the user identifier and the response to the second device; and storing, in memory circuitry of the second device, the user identifier and the response in a log to record a presence of the user of the first device within a range between the first and second devices of the short-range wireless protocol.

T. A non-transitory computer-readable medium including executable instructions, which when executed by circuitry, causes the circuitry to execute the method according to S.

The invention claimed is:

1. A system comprising:
a first device including
first communication circuitry configured to communicate with a second device by a short-range wireless protocol,
first control circuitry configured to
activate the first communication circuitry so that the first communication circuitry is detectable by the second device via the short-range wireless protocol, and
set a device name for the first communication circuitry to a user identifier that is specific to a user of the first device,
a receiver configured to receive a scan signal from the second device via the first communication circuitry and the short-range wireless protocol, and
a transmitter configured to transmit the user identifier to the second device via the first communication circuitry and the short-range wireless protocol in response to receiving the scan signal; and
the second device including
second communication circuitry configured to communicate with the first device by the short-range wireless protocol, and
second control circuitry configured to
activate the second communication circuitry to transmit the scan signal to the first device,
receive the user identifier of the first communication circuitry of the first device via the second communication circuitry and the short-range wireless protocol in response to the first device receiving the scan signal and transmitting the user identifier to the second device, and
store, in a memory of the second device, the user identifier in a log to record a presence of the user of the first device within a range between the first device and the second device, the range being a range of the short-range wireless protocol.

2. The system according to claim 1, further comprising:
a plurality of slave devices, each of the slave devices including the first communication circuitry and the first control circuitry, wherein
the second device is further configured to be a master device that executes an attendance scan and receives respective user identifiers corresponding to the slave devices in response to executing the attendance scan, and
the second device is further configured to record, in the memory of the second device, an attendance log representing a presence of users of the slave devices based on received user identifiers and corresponding times at which the user identifiers are received.

3. The system according to claim 2, wherein the second control circuitry of the second device is configured to
display, on a display of the second device, a graphical user interface for a user of the second device to log into the second device to activate the attendance scan and to access registration records that include a list of expected users that are expected to be detected via the attendance scan,
compare the received user identifiers with the list of expected users,
generate an attendance status of the expected users, and
record, in the memory of the second device, the attendance status of the expected users in the attendance log.

4. The system according to claim 3, wherein the second control circuitry of the second device is configured to display, on the display of the second device, a chart illustrating the attendance status of the expected users.

5. The system according to claim 3, wherein the second control circuitry of the second device is configured to display, on the display of the second device, a graphical user interface for the user of the second device to manually edit the attendance log.

6. The system according to claim 1, wherein the short-range wireless protocol is a Bluetooth protocol.

7. The system according to claim 1, wherein no network is established between the first and second devices via the short-range wireless protocol.

8. The system according to claim 1, wherein the second device requests the user identifier from the first device periodically.

9. The system according to claim 1, wherein the second device requests the user identifier from the first device based on a manual request by a user of the second device.

10. The system according to claim 1, wherein each of the first and second control circuitry is configured to download and execute an application and authenticate usage of the application, such that each of the first and second control circuitry is not authorized or able to communicate with each other via the short-range communication protocol to perform an attendance scan process until authentication has been performed.

11. The system according to claim 1, wherein
the device name for the first communication circuitry is preset to a device-specific identifier; and the first control circuitry is configured to set the device name for the first communication circuitry by replacing the device-specific identifier with the user identifier.

12. The system according to claim 11, wherein the user identifier is a student identification number or an email address.

13. The system according to claim 1, wherein the second control circuitry is configured to activate the second communication circuitry to transmit the scan signal to the first device every 30 seconds.

14. The system according to claim 1, wherein the first control circuitry is configured to set a status to idle or to available, such that the status of idle causes the transmitter to not transmit the user identifier to the second device, and the status of available causes the transmitter to transmit the user identifier to the second device.

15. The system according to claim 1, wherein the first and second devices are smartphones or tablets.

16. The system according to claim 1, wherein the second control circuitry of the second device is configured to
   access a registration database of a course;
   download registration records for the course from a remote server;
   display a list of students enrolled in the course; and
   display the list of students enrolled in the course together with an indication correlating the user identifier received form the first device with a student listed in the list of students enrolled in the course.

17. The system according to claim 1, wherein the short-range wireless protocol is a protocol that utilizes communication circuitry based on at least one of near-field communication (NFC), WiFi, infrared communications, ultrasonic signal generators, or radio-frequency identification (RFID) circuits.

18. A system comprising:
   a first device including
      first communication circuitry configured to communicate with a second device by a short-range wireless protocol,
      first control circuitry configured to
         activate the first communication circuitry so that the first communication circuitry is detectable by the second device via the short-range wireless protocol, and
         set a device name for the first communication circuitry to a string that includes a user identifier that is specific to a user of the first device and a response to an inquiry,
      a receiver configured to receive a scan signal from the second device via the first communication circuitry and the short-range wireless protocol, and
      a transmitter configured to transmit the device name, which includes the user identifier and the response, to the second device via the first communication circuitry and the short-range wireless protocol in response to receiving the scan signal; and
   the second device including
      second communication circuitry configured to communicate with the first device by the short-range wireless protocol, and
      second control circuitry configured to
         activate the second communication circuitry to transmit the scan signal to the first device,
         receive the device name, which includes the user identifier and the response, of the first communication circuitry of the first device via the second communication circuitry and the short-range wireless protocol in response to the first device receiving the scan signal and transmitting the device name to the second device, and
         store, in a memory of the second device, the user identifier and the response in a log to record the response of the user.

19. The system according to claim 18, further comprising:
   a plurality of slave devices, each of the slave devices including the first communication circuitry and the first control circuitry, wherein the second device is further configured to be a master device that executes an inquiry scan that receives respective user identifiers and responses corresponding to the slave devices in response to executing the inquiry scan, and
   the second device is further configured to record, in the memory of the second device, a response log representing a responses and user identifiers of users of the slave devices based on received user identifiers, responses, and corresponding times at which the device names are received.

20. The system according to claim 19, wherein the second control circuitry of the second device is configured to
   display, on a display of the second device, a graphical user interface for a user of the second device to log into the second device to activate the inquiry scan and to access registration records that include a list of expected users that are expected to be detected via the inquiry scan,
   compare the received user identifiers with the list of expected users,
   generate a status of the expected users in responding to the inquiry, and
   record, in the memory of the second device, the status of the expected users in the log.

* * * * *